United States Patent
Akagi et al.

(10) Patent No.: US 11,330,127 B2
(45) Date of Patent: May 10, 2022

(54) IMAGE READING APPARATUS AND IMAGE FORMING APPARATUS

(71) Applicant: CANON KABUSHIKI KAISHA, Tokyo (JP)

(72) Inventors: Daisuke Akagi, Tokyo (JP); Satoshi Seki, Tokyo (JP); Kaoru Hamada, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/150,929

(22) Filed: Jan. 15, 2021

(65) Prior Publication Data
US 2021/0250459 A1    Aug. 12, 2021

(30) Foreign Application Priority Data

Feb. 6, 2020   (JP) .............................. JP2020-019128

(51) Int. Cl.
*H04N 1/04*   (2006.01)
*H04N 1/00*   (2006.01)

(52) U.S. Cl.
CPC ....... *H04N 1/00774* (2013.01); *H04N 1/0062* (2013.01); *H04N 1/00689* (2013.01); *H04N 1/00734* (2013.01); *H04N 1/00748* (2013.01)

(58) Field of Classification Search
CPC ............. H04N 1/00774; H04N 1/0062; H04N 1/00689; H04N 1/00734; H04N 1/00748
See application file for complete search history.

(56) References Cited

U.S. PATENT DOCUMENTS

| | | | |
|---|---|---|---|
| 8,310,733 B2 | 11/2012 | Sekiguchi et al. | 358/474 |
| 8,432,586 B2 | 4/2013 | Hamano et al. | 358/505 |
| 10,447,876 B2 | 10/2019 | Hamada et al. | H04N 1/00801 |
| 10,447,890 B2 | 10/2019 | Mikami et al. | H04N 1/409 |
| 10,542,166 B2 | 1/2020 | Seki et al. | H04N 1/00745 |
| 10,554,847 B2 | 2/2020 | Akagi | H04N 1/00896 |
| 10,582,092 B2 | 3/2020 | Ishido et al. | H04N 1/028 |
| 10,602,002 B2 | 3/2020 | Akagi | H04N 1/0071 |
| 10,771,647 B2 | 9/2020 | Seki et al. | H04N 1/00801 |
| 2004/0091172 A1* | 5/2004 | Aihara | H04N 1/3878 382/298 |
| 2017/0214816 A1 | 7/2017 | Yamakawa et al. | H04N 2201/04755 |

(Continued)

FOREIGN PATENT DOCUMENTS

JP   2010-118911        5/2010
JP   2017168941 A  *  9/2017  .......... H04N 1/0005

*Primary Examiner* — Cheukfan Lee
(74) *Attorney, Agent, or Firm* — Venable LLP

(57) ABSTRACT

An image reading apparatus includes: at least one processor configured to: set reading resolutions in a first and a second directions when reading an image of a document; determine an inclination amount of the document; correct an image to reduce the inclination amount; output image data indicative of a corrected image; and obtain information relating to a first direction length of the document. In a case where the first direction length of the document is less than a predetermined length and the processor outputs the image data indicative of the corrected image, whose resolution in the first direction is a first resolution and resolution in the second direction is a second resolution lower than the first resolution, the processor sets the reading resolution in the second direction to a third resolution higher than the second resolution.

15 Claims, 16 Drawing Sheets

(56) References Cited

U.S. PATENT DOCUMENTS

| | | | |
|---|---|---|---|
| 2017/0264782 A1* | 9/2017 | Hashimoto | H04N 1/00005 |
| 2020/0177737 A1 | 6/2020 | Akagi | H04N 1/00737 |
| 2020/0252513 A1* | 8/2020 | Nakada | H04N 1/00779 |
| 2020/0336689 A1 | 10/2020 | Akagi | H04N 1/00018 |
| 2021/0245979 A1* | 8/2021 | Hamada | H04N 1/00652 |

* cited by examiner

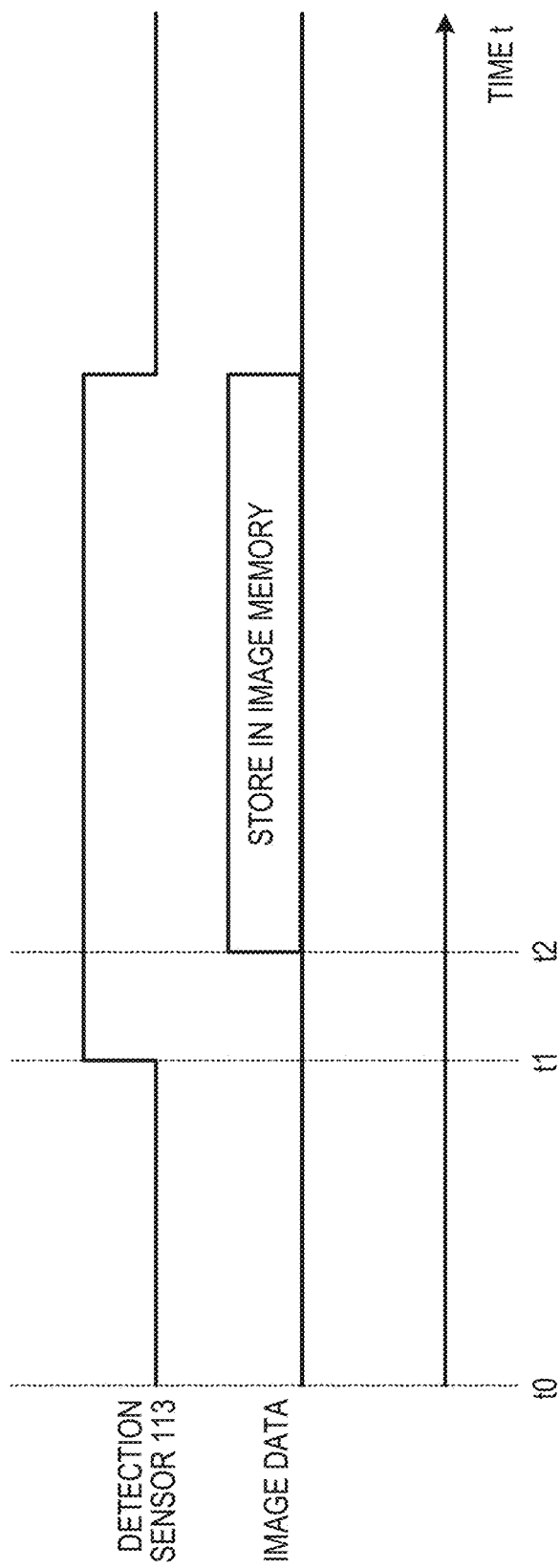

FIG. 9A

| DOCUMENT SIZE | DOCUMENT LENGTH (mm) | CONVEYANCE SPEED (mm/s) | INTERVAL (mm) | TIME PERIOD t3 (s) | READ PRODUCTIVITY (s) |
|---|---|---|---|---|---|
| A4R | 297 | 210 | 120 | 0.57 | 30 |
| B5R | 257 | 210 | 170 | 0.81 | 30 |
| A5R | 210 | 210 | 210 | 1.00 | 30 |
| A5 | 148 | 210 | 270 | 1.29 | 30 |
| A6R | 148 | 210 | 270 | 1.29 | 30 |

FIG. 9B

| DOCUMENT SIZE | DOCUMENT LENGTH (mm) | CONVEYANCE SPEED (mm/s) | INTERVAL (mm) | TIME PERIOD t4 (s) | READ PRODUCTIVITY (s) |
|---|---|---|---|---|---|
| A4R | 297 | 340 | 115 | 0.34 | 50 |
| B5R | 257 | 340 | 155 | 0.46 | 50 |

FIG. 9C

| DOCUMENT SIZE | DOCUMENT LENGTH (mm) | CONVEYANCE SPEED (mm/s) | INTERVAL (mm) | TIME PERIOD t5 (s) | READ PRODUCTIVITY (s) |
|---|---|---|---|---|---|
| A5R | 210 | 210 | 40 | 0.19 | 50 |
| A5 | 148 | 210 | 105 | 0.5 | 50 |
| A6R | 148 | 210 | 105 | 0.5 | 50 |

FIG. 14

| DOCUMENT SIZE | DOCUMENT LENGTH (mm) | DOCUMENT WIDTH (mm) | DOCUMENT LENGTH DETECTION SENSOR |
|---|---|---|---|
| A4R | 297 | 210 | DETECTION |
| B5R | 257 | 182 | DETECTION |
| A5R | 210 | 148 | DETECTION |
| A5 | 148 | 210 | NON-DETECTION |
| A6R | 148 | 105 | NON-DETECTION |

IMAGE READING APPARATUS AND IMAGE FORMING APPARATUS

BACKGROUND OF THE INVENTION

Field of the Invention

The present invention relates to an image reading apparatus that reads an image of a document and an image forming apparatus including the image reading apparatus.

Description of the Related Art

An image reading apparatus reads an image of a document by emitting light at the document and the reflected light being detected by a reading unit provided with an image capture unit. In a known image reading apparatus, a document is fed to a conveyance path using an automatic document feeder (ADF) and the document conveyed along the conveyance path is read by a reading unit.

With such an image reading apparatus, variations in the nip pressure and rotation speed of a roller conveying the document may cause the document to be skewed or variations in the position of the document in the width direction (hereinafter, also referred to as the main-scanning direction) orthogonal to the conveyance direction (hereinafter, also referred to as the sub-scanning direction). In Japanese Patent Laid-Open No. 2010-118911, a configuration is described in which a shadow of a leading end of a document in the sub-scanning direction is detected from image data indicating the reading result, and the image data is rotationally corrected on the basis of an inclination angle (skew angle) of the shadow of the leading end of the document with respect to the main-scanning direction.

Image reading apparatuses are configured to read a document at a plurality of resolutions. Note that the resolution in the main-scanning direction (hereinafter referred to as the main-scanning resolution) and the resolution in the sub-scanning direction (hereinafter referred to as the sub-scanning resolution) may be the same value or a different value. For example, the main-scanning resolution and the sub-scanning resolution may be the same value of 600 dpi. Also, the main-scanning resolution may be 300 dpi while the sub-scanning resolution is 600 dpi. Hereinafter, the resolution is indicated by X×Y, with X (dpi) representing the main-scanning resolution and Y (dpi) representing the sub-scanning resolution.

FIG. 16A illustrates an image corresponding to image data of a document with a skew angle of 5° read at a resolution of 600×600. FIG. 16B illustrates an image corresponding to image data of a document with a skew angle of 5° read at a resolution of 300×600. Note that the interval of the pixels in the main-scanning direction is the same. As illustrated in FIG. 16A, in a case where the main-scanning resolution and the sub-scanning resolution are equal, the skew angle of the document determined from the image data is the actual skew angle of 5°. However, as illustrated in FIG. 16B, when the main-scanning resolution is half of the sub-scanning resolution, the pixel size in the main-scanning resolution is halved, and the image shown by the image data is compressed to half the size in the main-scanning direction. Thus, the skew angle of the document determined from the image data is 10°, twice the actual skew angle.

When the image data of FIG. 16A is rotationally corrected, the image data is rotated in the anticlockwise direction 5°, the same value as the actual skew angle. However, when the image data of FIG. 16B is rotationally corrected, the image data needs to be rotated in the anticlockwise direction 10°, twice the value of the actual skew angle of the document. When rotationally correcting the image data, affine transformation or the like can be used. Rotational correction corrects the inclination of the image. However, steps may appear in lines in the main-scanning direction where the line has been offset in the sub-scanning direction at a plurality of position in the main-scanning direction.

With rotational correction, the larger the angle to be corrected, the more steps appear. In other words, with rotational correction, the larger than angle to be corrected, the greater the image degradation.

SUMMARY OF THE INVENTION

According to an aspect of the present disclosure, an image reading apparatus includes: a stacking unit where a document is to be stacked; a conveying unit configured to convey the document stacked on the stacking unit in a first direction; a regulating unit configured to regulate a position, in a second direction orthogonal to the first direction, of the document stacked on the stacking unit; a reading unit configured to read an image of the document conveyed by the conveying unit, the reading unit including a light-receiving element configured to receive light; and at least one processor. The at least one processor is configured to: generate image data representing a light receiving result by the light-receiving element; set a reading resolution in the first direction when the reading unit reads the image of the document and a reading resolution in the second direction when the reading unit reads the image of the document, the reading unit reading the image of the document at the set reading resolution; determine an inclination amount corresponding to an inclination angle of an edge of the document on a leading end side in the first direction with respect to the second direction on the basis of the generated image data; correct an image represented by the generated image data to reduce the inclination amount; output image data indicative of an corrected image; and obtain information relating to a length in the first direction of the document to be read by the reading unit. In a case where a length in the first direction of the document is greater than a predetermined length and the at least one processor outputs the image data indicative of the corrected image, whose resolution in the first direction is a first resolution and resolution in the second direction is a second resolution lower than the first resolution, the at least one processor sets the reading resolution in the first direction to the first resolution and sets the reading resolution in the second direction to the second resolution. In a case where the length in the first direction of the document is less than the predetermined length and the at least one processor outputs the image data indicative of the corrected image, whose resolution in the first direction is the first resolution and resolution in the second direction is the second resolution, the at least one processor sets the reading resolution in the first direction to the first resolution and sets the reading resolution in the second direction to a third resolution higher than the second resolution.

Further features of the present invention will become apparent from the following description of exemplary embodiments with reference to the attached drawings.

BRIEF DESCRIPTION OF THE DRAWINGS

FIG. 3 is an explanatory diagram of the timing for obtaining image data stored in an image memory.

FIGS. 9A to 9C are diagram illustrating the relationship between document size, conveyance speed, and read productivity.

FIG. 14 is an explanatory diagram of a method of determining document size.

DESCRIPTION OF THE EMBODIMENTS

Figure 1:
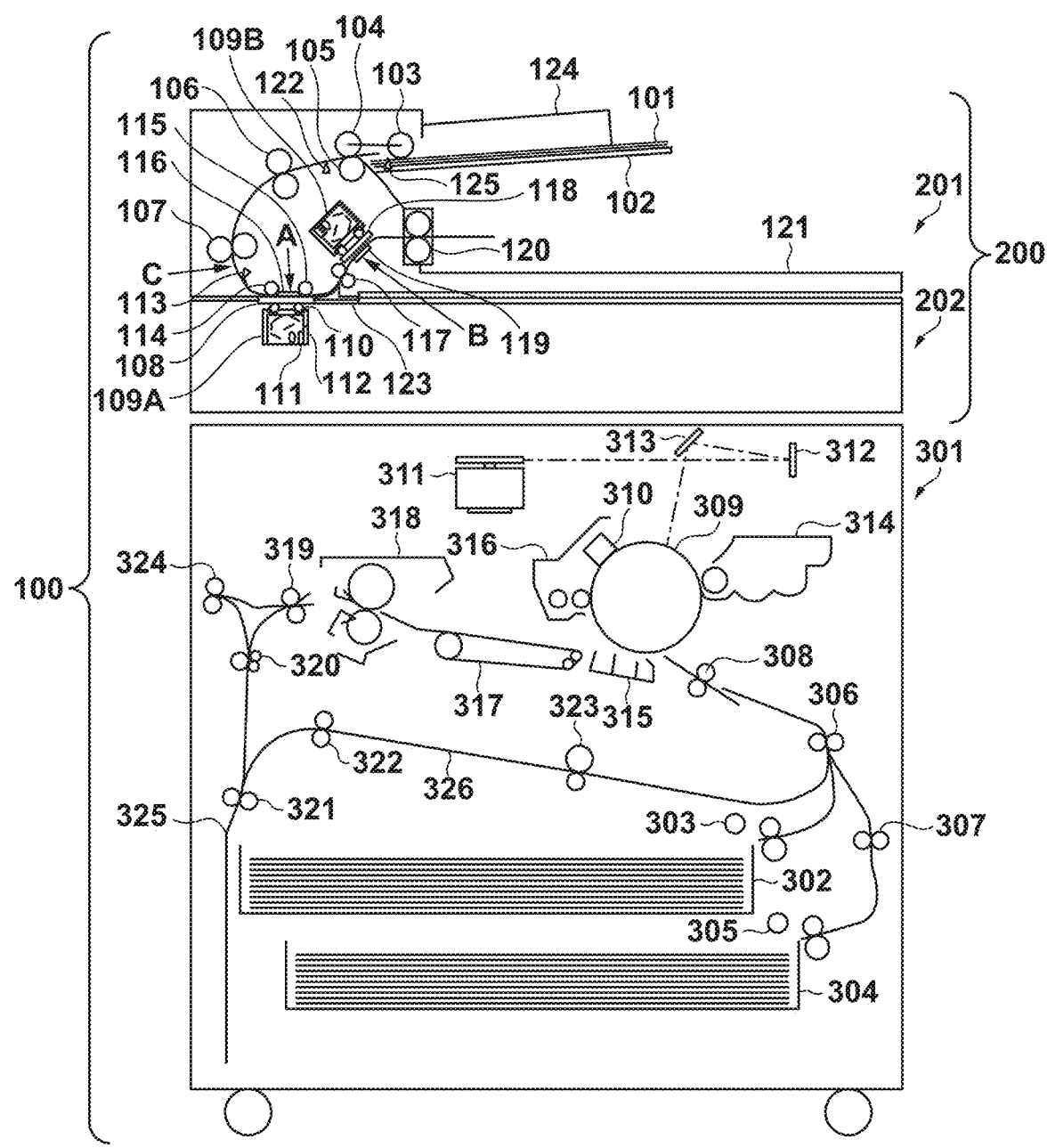
FIG. 1 is a configuration diagram of an image forming apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a configuration diagram of a monochrome electrophotographic copy machine (hereinafter, referred to as an image forming apparatus) 100 of the present embodiment. Note that the image forming apparatus is not limited to a copy machine and may be a facsimile machine, a printer, or the like. Also, the image forming method is not limited to electrophotography and may be inkjet or the like. Furthermore, the type of the image forming apparatus may be monochrome or may be color.

The configuration and functions of the image forming apparatus 100 will be described below using FIG. 1. As illustrated in FIG. 1, the image forming apparatus 100 includes an image reading apparatus 200 including a document feeding device 201 and a reading device 202 and an image printing device 301. The document feeding device 201 can rotate towards and away from the reading device 202.

Image Reading Apparatus

A document 101 to be read is placed on a tray 102. A side regulating plate 124 is provided on the tray 102 for regulating the position of the document 101 in the main-scanning direction (width direction). The side regulating plate 124 is configured to slide in the main-scanning direction. By the user sliding the side regulating plate 124 to match the width of the document 101 placed on the tray 102, the orientation of the document can be regulated to prevent skew. A pickup roller 103 feeds the document 101 placed on the tray 102 inside the image reading apparatus 200. Separation rollers 104 and 105 are provided to prevent a plurality of documents 101 being fed at the same time by the pickup roller 103. The document 101 fed along the conveyance path is conveyed toward a reading position A by a conveyance roller 106 and a lead roller 107.

A transparent glass 108 is disposed at the reading position A, and a reading unit 109A is provided on the opposite side of the glass 108 from the conveyance path. The reading unit 109A includes an LED 110, an image sensor 111, and an optical component group 112. The image sensor 111 includes a plurality of pixels arranged in the main-scanning direction for receiving red (R), green (G), and blue (B) light.

Figure 2:
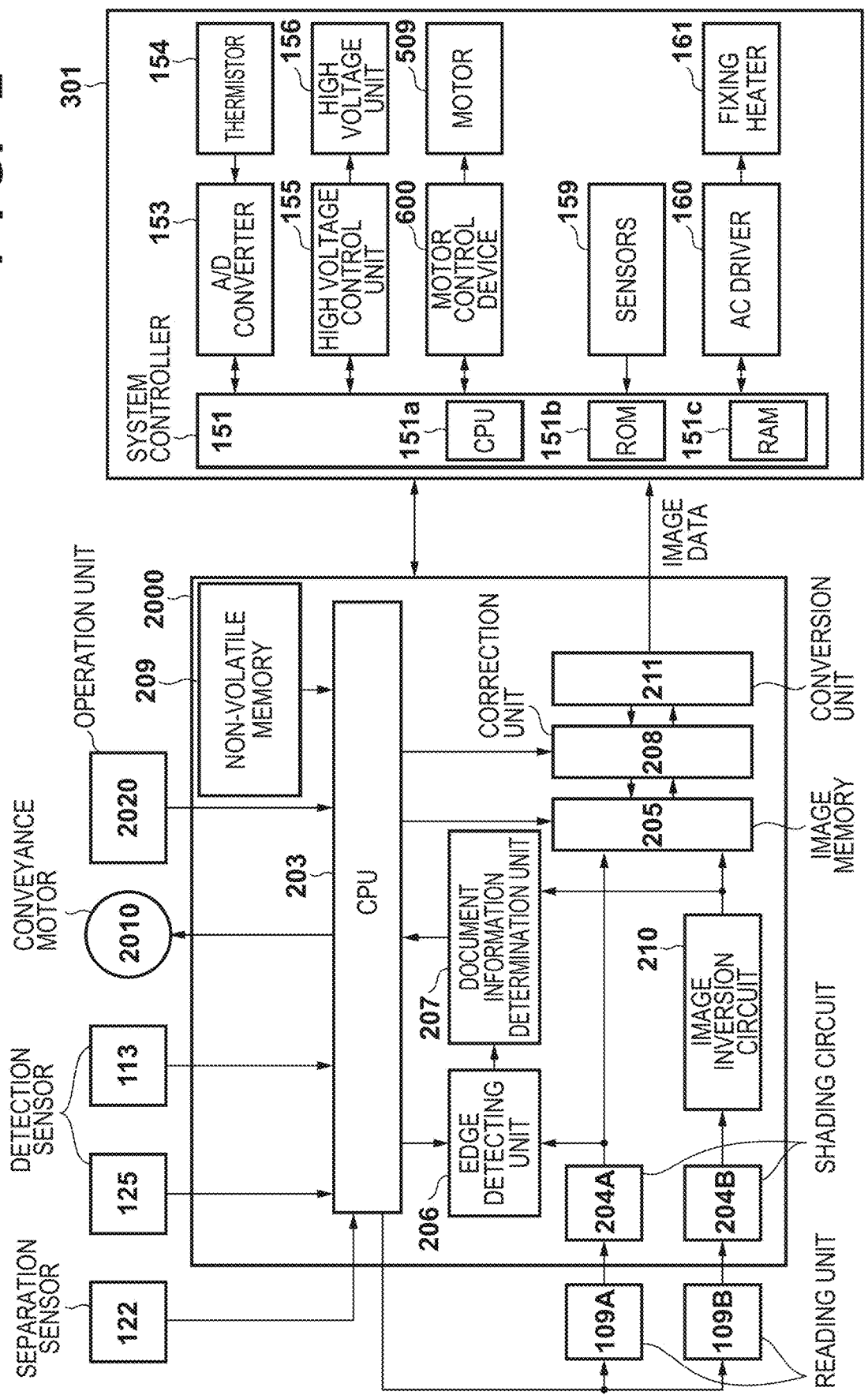
FIG. 2 is a diagram of the control configuration of an image forming apparatus according to an embodiment.

The reading unit 109A reads an image of a front surface (first surface: read surface) of the document 101 in the manner described below. Specifically, the LED 110 acts as a light source, emits light at the front surface of the document 101 through the glass 108. The optical component group 112 guides the reflected light from the document 101 received through the glass 108 to the image sensor 111. The image sensor 111 outputs analog image data based on the received reflected light. Note that that the image sensor 111 simultaneously reads an image of one line that spans the main-scanning direction. The image sensor 111 read an image of one line a plurality of times while the document 101 is being conveyed. In this way, the image sensor 111 can output image data including the entire document 101. A non-illustrated A/D converter unit of the reading unit 109 converts the analog image data to digital image data and outputs this to a controller 2000 (FIG. 2).

A detection sensor 113 for detecting the document 101 is provided upstream of the reading position A in the conveyance direction of the document 101. The controller 2000 determines the timing for the reading unit 109 to start reading the document 101 on the basis of the timing of when the detection sensor 113 detects the leading end of the document 101. Pressing rollers 114 and 115 press the document 101 against the glass 108. Note that a guide plate 116 which is white, the reference color, is disposed at a position opposite the reading unit 109A between the pressing rollers 114 and 115, or, in other words, on the opposite side of the conveyance path along which the document is conveyed from the reading unit 109A.

When the document 101 passes the reading position A, it is conveyed toward a reading position B by a conveyance roller 117. A transparent glass 118 is disposed at the reading position B, and a reading unit 109B is provided on the opposite side of the glass 118 from the conveyance path. The reading unit 109B has the same configuration as the reading unit 109A and reads an image of a rear surface (second surface: read surface) of the document 101. The timing for the reading unit 109B to start reading is also determined on the basis of the timing of when the detection sensor 113 detects the document. A white guide plate 119 is disposed at a position opposite the reading unit 109B.

When the document 101 passes the reading position B, it is discharged onto a discharge tray 121 by a discharge roller 120. A white reference plate 123 is provided on the right side of the glass 108. The reference plate 123 is a reference reading member for when shading data is obtained. Also, a separation sensor 122 is provided downstream of the separation roller 104. The feed timing of the next document 101 is control on the basis of the detection result of the document 101 by the separation sensor 122. Note that a position C illustrated in the FIG. 1 will be described when describing a third embodiment. Also, a detection sensor 125 detects if there is a document on the tray 102.

Image Printing Device

Sheet holding trays 302, 304 are provided inside the image printing device 301. Different types of recording media can be held in the sheet holding trays 302, 304. For example, A4-size plain paper can be held in the sheet holding tray 302, and A4-size thick paper can be held in the sheet holding tray 304. Note that a recording medium is a medium on which an image can be formed by an image forming apparatus. Examples of recording media include a sheet, a resin sheet, cloth, an overhead projector (OHP) sheet, a label, and the like.

A recording medium held in the sheet holding tray 302 is fed by a pickup roller 303 and sent out to registration rollers 308 by conveyance rollers 306. Also, a recording medium held in the sheet holding tray 304 is fed by a pickup roller 305 and sent out to the registration rollers 308 by conveyance rollers 307 and 306.

Image data output from the image reading apparatus 200 is input to an optical scanning device 311 that includes a semiconductor laser and a polygon mirror. Also, the outer circumferential surface of a photosensitive drum 309 is charged by a charging device 310. After the outer circumferential surface of the photosensitive drum 309 is charged, a laser beam corresponding to the image signal input from the image reading apparatus 200 to the optical scanning device 311 is emitted from the optical scanning device 311 to the outer circumferential surface of the photosensitive drum 309 via the polygon mirror and mirrors 312, 313. As a result, an electrostatic latent image is formed on the outer circumferential surface of the photosensitive drum 309.

Next, the electrostatic latent image is developed with toner in a developing device 314 to form a toner image on the outer circumferential surface of the photosensitive drum 309. The toner image formed on the photosensitive drum 309 is transferred onto the recording medium by a transfer charging device 315 provided at a position (a transfer position) opposite the photosensitive drum 309. The registration rollers 308 send the recording medium to the transfer position matching the transfer timing of when the transfer charging device 315 transfers the image on the recording medium.

The recording medium onto which the toner image has been transferred as described above is sent to a fixing device 318 by a conveyor belt 317 and is heated and pressed by the fixing device 318. This fixes the toner image to the recording medium. In this manner, an image is formed on a recording medium by the image forming apparatus 100.

In a case where an image is formed in a one-sided printing mode, the recording medium having passed through the fixing device 318 is discharged to a discharge tray (not illustrated) by discharge rollers 319, 324. Also, in a case where an image is formed in a two-sided printing mode, a fixing process is performed on the first surface of the recording medium by the fixing device 318, and then, the recording medium is conveyed to a reverse path 325 by the discharge rollers 319, conveyance rollers 320, and reverse rollers 321. Then, the recording medium is conveyed to the registration rollers 308 again by conveyance rollers 322, 323, and an image is formed on the second surface of the recording medium by the method described above. Then, the recording medium is discharged to the discharge tray (not illustrated) by the discharge rollers 319, 324.

In a case where the recording medium with an image formed on the first surface is discharged face down to outside the image forming apparatus 100, the recording medium having passed through the fixing device 318 is conveyed through the discharge rollers 319 in a direction toward the conveyance rollers 320. Then, immediately before the trailing end of the recording medium passes through a nip portion of the conveyance rollers 320, the rotation of the conveyance rollers 320 is reversed, thereby discharging the recording medium to outside the image forming apparatus 100 via the discharge rollers 324 in the state with the first surface of the recording medium facing down. Thus, ends the description of the configuration and functions of the image forming apparatus 100.

Control Configuration

FIG. 2 is a control configuration diagram of the image forming apparatus 100. First, the control configuration of the image printing device 301 will be described. As illustrated in FIG. 2, a system controller 151 includes a CPU 151a, ROM 151b, and RAM 151c. The system controller 151 is connected to an analog-to-digital (A/D) converter 153, a high voltage control unit 155, a motor control device 600, sensors 159, and an AC driver 160. The system controller 151 is capable of transmitting and receiving data and a command to and from the units connected to the system controller 151.

The CPU 151a reads and executes various programs stored in the ROM 151b to executing various sequences related to an image forming sequence determined in advance. The RAM 151c is a storage device. The RAM 151c stores various types of data, such as a setting value for the high voltage control unit 155, a command value for the motor control device 600, and the like. The system controller 151 receives signals from the sensors 159 and, on the basis of the received signals, sets a setting value of the high voltage control unit 155.

According to the setting value set by the system controller 151, the high voltage control unit 155 supplies the required voltage to a high voltage unit 156 (the charging device 310, the developing device 314, and the transfer charging device 315). The motor control device 600 controls a motor 509 that drives the load provided in the image printing device 301 in accordance with a command output from the CPU 151a. The A/D converter 153 receives a detection signal detected by a thermistor 154 that detects the temperature of a fixing heater 161, then converts the detection signal from an analog signal to a digital signal and transmits the digital signal to the system controller 151. The system controller 151 controls the AC driver 160 on the basis of the digital signal received from the A/D converter 153. The AC driver 160 controls the fixing heater 161 so that the temperature of the fixing heater 161 becomes a temperature required to perform a fixing process. Note that the fixing heater 161 is a heater used in the fixing process and is included in the fixing device 318. As described above, the system controller 151 controls the operation sequence of the image forming apparatus 100.

Next, the control configuration of the image reading apparatus 200 will be described. A CPU 203 of the controller 2000 controls the image reading apparatus 200 by executing a program stored in a non-volatile memory 209.

A conveyance motor 2010 is a drive source of the rollers provided in the document feeding device 201 and is rotationally driven by control via the controller 2000. An operation unit 2020 provides a user interface. For example, the user can give an instruction to read the document 101 by operating the operation unit 2020. Also, at this time, the user can set the resolution and the size of the document 101. The resolution set by the user is stored in a storage unit (not illustrated) of the controller 2000. In this case, the operation unit 2020 and the CPU 203 function as a setting unit for setting the resolution. In the present example, the user can set the resolution to 600×600 or 300×600. Also, in the present example, the user can set the document size to A4R, B5R, A5R, A5, or A6R. The CPU 203 receives the information set by the user from the operation unit 2020 and outputs the information set by the user to the system controller 151.

The system controller 151 transmits information indicative of the state of the image forming apparatus to the operation unit 2020. Note that information indicative of the state of the image forming apparatus is information relating to the number of sheets for image forming, the progress status of an image forming operation, sheet jam or multi-feed in the image printing device 301 or the document feeding device 201, and the like. The operation unit 2020 displays the information received from the system controller 151 on a display unit.

In response to a read instruction, the CPU 203 controls the feeding and conveying of the document 101 at a speed suitable for the resolution and document size set via the operation unit 2020. Also, as described below, the CPU 203 determines the read resolution for the reading units 109A, 109B on the basis of the set resolution and document size. Furthermore, the CPU 203 controls the reading units 109A, 109B so that the reading units 109A, 109B read the document 101 at the determined read resolution. The reading units 109A, 109B output digital image data, i.e., the read result, to the controller 2000. The image data has a value that is higher that greater the intensity of the reflected light. Hereinafter, this value level is referred to as a luminance level. Also, hereinafter, the image data output by the reading unit 109A is referred to as front surface image data, and the image data output by the reading unit 109B is referred to as rear surface image data.

The front surface image data output by the reading unit 109A is input to a shading circuit 204A. The rear surface image data output by the reading unit 109B is input to a shading circuit 204B. The shading circuits 204A, 204B performs addition and subtraction calculations and multiplication and division calculations on the image data to correct (shading correction) the effects of the non-uniformity of the amount of light from the LED 110 and sensitivity inhomogeneity of the pixels of the image sensor 111 and generates image data uniform in the main-scanning direction. The front surface image data post shading correction by the shading circuit 204A is stored in image memory 205. On the other hand, the rear surface image data post shading correction by the shading circuit 204B is input into an image inversion circuit 210.

The image inversion circuit 210 inverts the main-scanning direction of the rear surface image data. This is because in the present embodiment, the reading unit 109A and the reading unit 109B have the same configuration, and the main-scanning direction of the image read by the reading unit 109B is inverted with respect to the image read by the reading unit 109A. The rear surface image data post processing by the image inversion circuit 210 is stored in the image memory 205. Note that hereinafter, the processing executed on the front surface image data will be described. However, the same processing is also executed on the rear surface image data.

FIG. 3 is an explanatory diagram of the timing for obtaining the front surface image data stored in the image memory 205. After conveyance of the document 101 is started at time to, the detection sensor 113 detects the leading end of the document 101 at time t1. The CPU 203 determines a time t2, based on the time t1, before the document 101 has reached the reading position A on the basis of the conveyance speed of the document 101, for example. Also, the CPU 203 stores the front surface image data output from the reading unit 109A in the image memory 205 during a predetermined time period from the time t2. Note that this predetermined time period is at least the time period until the trailing end of the document 101 passes the reading position A. The predetermined time period is calculated using the conveyance speed of the document 101. Note that hereinafter, the image indicative of the front surface image data is referred to as the read image.

Returning to FIG. 2, the image data output from the shading circuit 204A is also input into an edge detecting unit 206. The edge detecting unit 206 detects the detection target edge of the document from the read image indicative of the image data. In the present embodiment, the detection target edge is the edge (leading end edge) of the document 101 on the leading end side in the conveyance direction. Note that in the present embodiment, the leading end edge of the document is detected using the G image data from among the input RGB image data. However, any color can be used to detect the leading end edge.

Figure 4A:
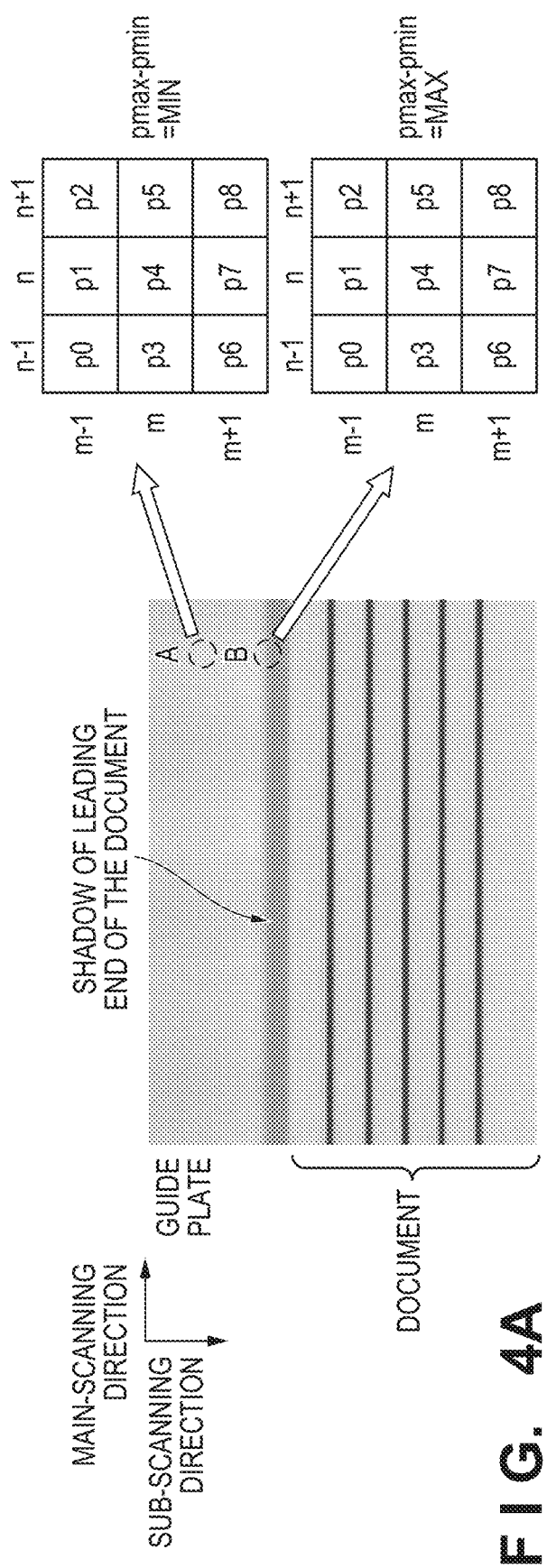
FIGS. 4A and 4B are explanatory diagrams of the processing executed by an edge detecting unit according to an embodiment.
Figure 4B:
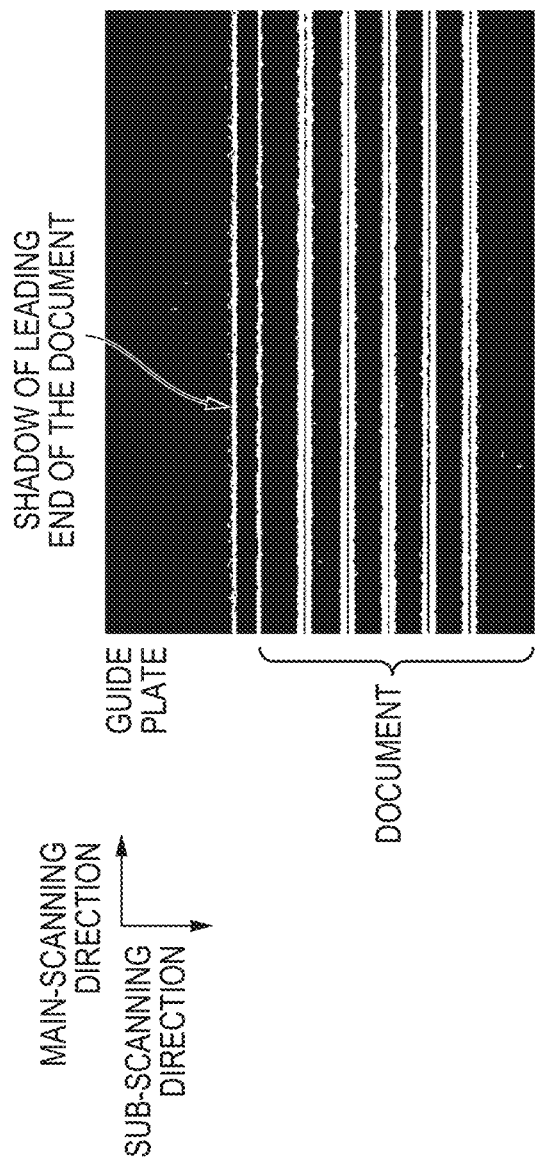

FIGS. 4A and 4B are explanatory diagrams of the processing executed by the edge detecting unit 206. FIGS. 4A and 4B illustrates images in which rows of pixels in the main-scanning direction obtained by the reading unit 109A every predetermined amount of time from the time t2 are combined in the sub-scanning direction. As described above, the front surface image data input into the edge detecting unit 206 is image data from the time t2 before the leading end of the document 101 in the conveyance direction has reached to the reading position A. In other words, when the reading unit 109A starts reading an image, first, the guide plate 116 is read. Then, as the document 101 is conveyed, the image of the document 101 is read. In other words, the front surface image data input into the edge detecting unit 206 includes image data showing the guide plate 116 and image data showing the edge of the document 101 on the leading end side. The edge detecting unit 206 executes binarization processing of the front surface image data in which a 9 pixel region, 3 pixels in the main-scanning direction by 3 pixels in the sub-scanning direction, is taken as a single block. Hereinafter, the number of pixels in the main-scanning direction of the reading unit 109A is 7488, and the reading unit 109A performing reading 12000 times within the predetermined time period. Also, the pixel position in the main-scanning direction is represented by n ($1 \leq n \leq 7488$), and the pixel position in the sub-scanning direction is represented by m (($1 \leq m \leq 12000$). Also, the luminance value of the nine pixels in one block is represented by px (x=0 to 8), and the maximum value and the minimum value are represented by pmax and pmin.

At point A of FIG. 4A, for example, all of the 9 pixels correspond to a guide plate 116 (white) section, and with all 9 pixels being a white pixel, the difference between the pmax and the pmin is a small value. On the other hand, point B of FIG. 4A, for example, is at an interface between the guide plate 116 (white) and the shadow (gray) of the edge on the leading end side. Here, among the nine pixels there are both white pixels and gray pixels. Thus, the difference between the pmax and the pmin is large. Accordingly, in a case where the difference between the pmax and the pmin is greater than a predetermined threshold pth, a pixel (hereinafter, referred to as a candidate pixel) that is a candidate for the edge on the leading end side in the block can be determined. In the present embodiment, when the difference between the pmax and the pmin in the block is greater than the predetermined threshold pth, a central pixel (a pixel with the coordinates (n, m)) of the block is determined as the candidate pixel. This determination processing is executed for each n, m excluding n=1, n=7488, m=1, and m=12000. Note that 1 unit of the scale in the x-axis and the y-axis in the present embodiment corresponds to the distance between the central position of two adjacent pixels.

FIG. 4A is an image indicative of 8-bit (luminance level: 0 to 255) G image data. FIG. 4B is an image indicative of image data obtained by binarizing the image data of the image of FIG. 4A, with the threshold pth equaling 14. The white in FIG. 4B indicates pixels determined to be candidates for where the edge of the document 101 on the leading end side caused a shadow in the processing described above. Among the plurality of candidate pixels illustrated in FIG. 4B, the row of candidate pixels in the main-scanning direction closest to the leading end side in the sub-scanning direction (the pixel row in the main-scanning direction first determined to be a candidate pixel in the sub-scanning direction) is determined to be a shadow caused by the edge of the document 101 on the leading end side.

Figure 5:
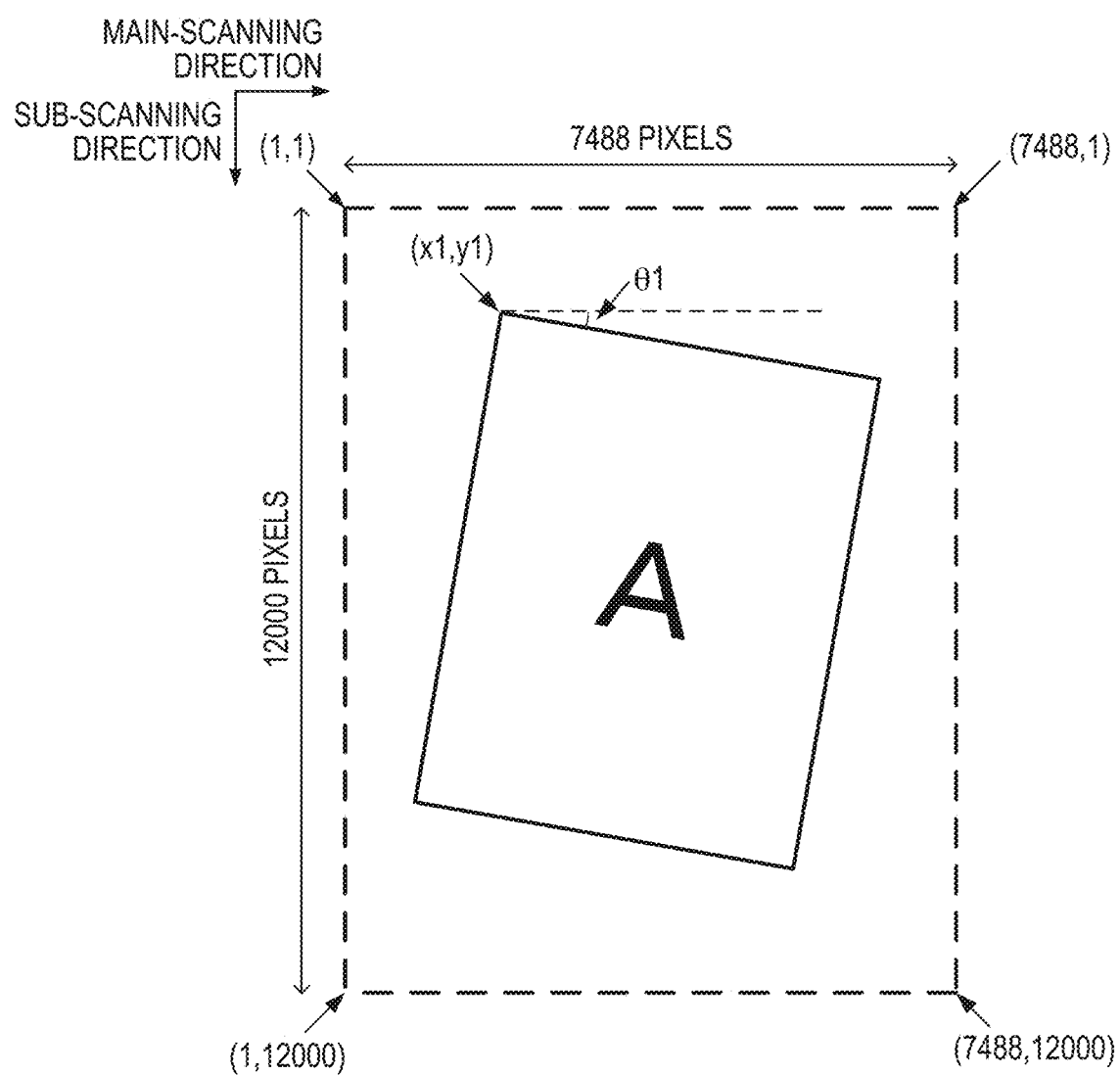
FIG. 5 is an explanatory diagram of document information according to an embodiment.

Returning to FIG. 2, the binary data output by the edge detecting unit 206 is input into a document information determination unit 207. FIG. 5 is an image indicative of the binary data input into the document information determination unit 207. The image indicative of the binary data input into the document information determination unit 207 is the image with the area indicated by the broken line in FIG. 5 and contains the document 101. The area indicated by the broken line corresponds to n=1 to 7488 and m=1 to 12000.

The document information determination unit 207 determines document information of the front surface on the basis of the input binary data. Also, the document information determination unit 207 determines a distance (width) W in the main-scanning direction between two corner portions on the leading end side of the shadow cause by the document 101. Also, the document information determination unit 207 outputs the front surface document information and the width W to the CPU 203. Herein, the front surface document information is information including the position and angle of the document in the read image. Note that the position of the document 101 is the position (x1, y1) of a predetermined first position of the document 101 in the read image. In the present embodiment, the first position is one of the two corner portions (the left corner portion in FIG. 5) on the leading end side of the shadow caused by the document 101. Also, the angle of the document 101 is the angle of a predetermined edge of the document 101 in the read image with respect to a reference direction of the read image. In the present embodiment, the predetermined edge is the shadow caused by the edge of the document 101 on the leading end side, and the reference direction is the main-scanning direction. In other words, the angle of the document 101 is $\theta 1$ in FIG. 5. Note that in a case where the shadow caused by the edge on the leading end side in the conveyance direction is inclined upsteam of the position (x1, y1), the angle $\theta 1$ is a negative value. In a case where the shadow is inclined downstream of the position (x1, y1), the angle $\theta 1$ is a positive value.

The CPU 203 outputs the width W and the document information, i.e., the position (x1, y1) and the angle $\theta 1$, to a correction unit 208. The correction unit 208 reads the image data stored in the image memory on the basis of the position (x1, y1) and the angle $\theta 1$ and outputs the image data to the system controller 151. Specifically, the correction unit 208 takes the position (x1, y1) as the starting point and reads the image data in a direction parallel with the shadow caused by the edge of the document 101 on the leading end side. When the correction unit 208 reads from the position (x1, y1) just the amount corresponding to the width W in the direction parallel with the shadow, just the amount corresponding to the width W in the direction parallel with the shadow is read from position (x2, y2). Note that x2, y2 is represented by the following equations, for example.

$$x2 = x1 - \tan \theta 1 \quad (3)$$

$$y2 = y1 + 1 \quad (4)$$

Note that in the present embodiment, x2, y2 is determined using equations (3) and (4), but no such limitation is intended. As described above, the correction unit 208 reads the front surface image data stored in the image memory until the trailing end side of the document.

Figure 6A:
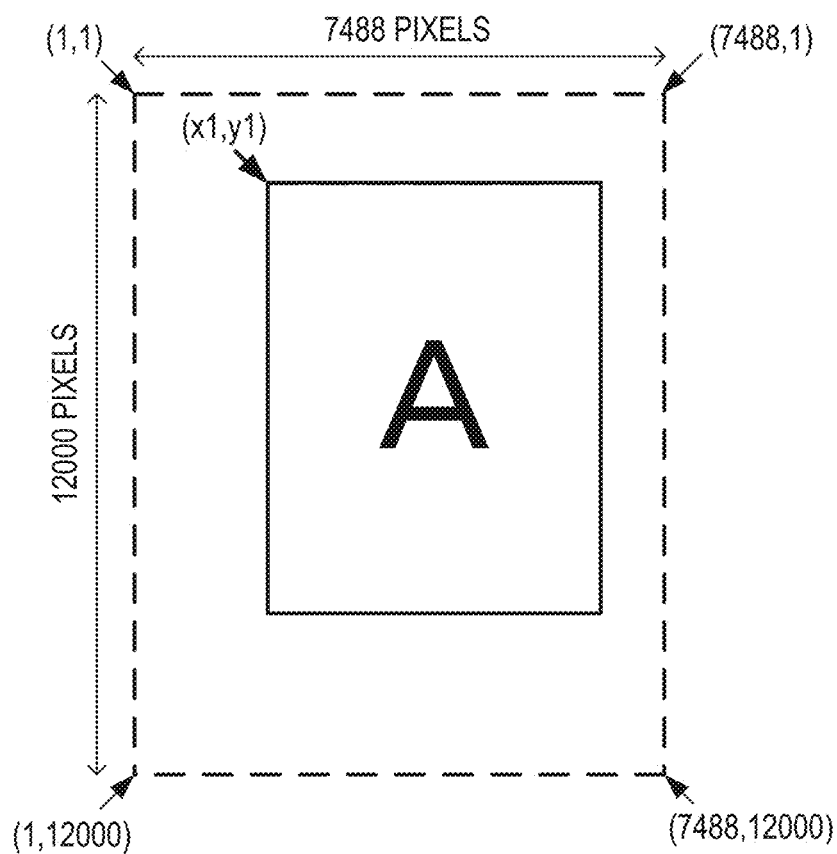
FIGS. 6A and 6B are explanatory diagrams of registration correction processing according to an embodiment.
Figure 6B:
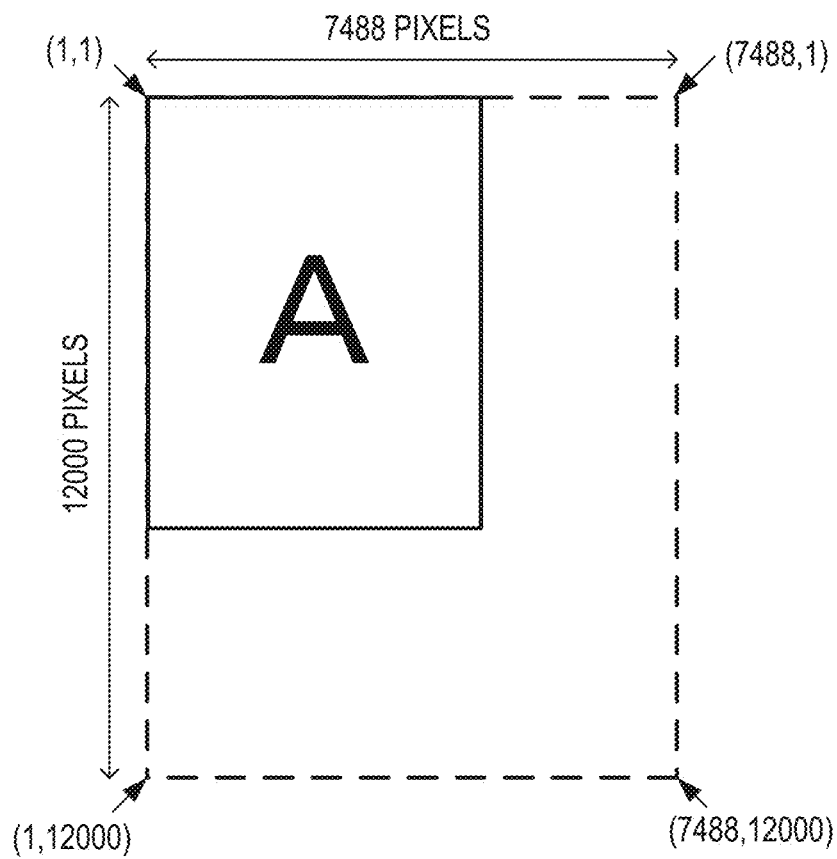

FIG. 6B is a diagram illustrating an image read by the correction unit 208. As illustrated in FIG. 6B, when the image is read just an amount corresponding to the width W in a direction parallel with the shadow, the shadow caused by the edge of the document on the leading end side is parallel with the main-scanning direction.

A conversion unit 211 converts the resolution of the image data as necessary according to an instruction from the CPU 203. Note that the processing executed by the conversion unit 211 will be described in detail below.

The system controller 151 trims the image data output from the conversion unit 211 to the image area to be printed. Specifically, for example, the system controller 151 trims the image data using as a reference the position (1, 1) of the image data illustrated in FIG. 6B output from the conversion unit 211 to correspond to the size of the recording medium set by the user using the operation unit 2020. More specifically, for example, when the document illustrated in FIG. 6B is A4 size and the size of the recording medium set by the user using the operation unit 2020 is A4 size, the system controller 151 can trim the image of the document to remove shadow at the right end of the document and shadow at the trailing end of the document. The system controller 151 controls the image printing device 301 to print according to the trimmed image data. In other words, the system controller 151 functions as an external apparatus. Note that examples of an external apparatus include, not just the system controller 151 provided in the image forming apparatus 100, but also a smartphone, a tablet, a PC, and the like.

Figure 7:
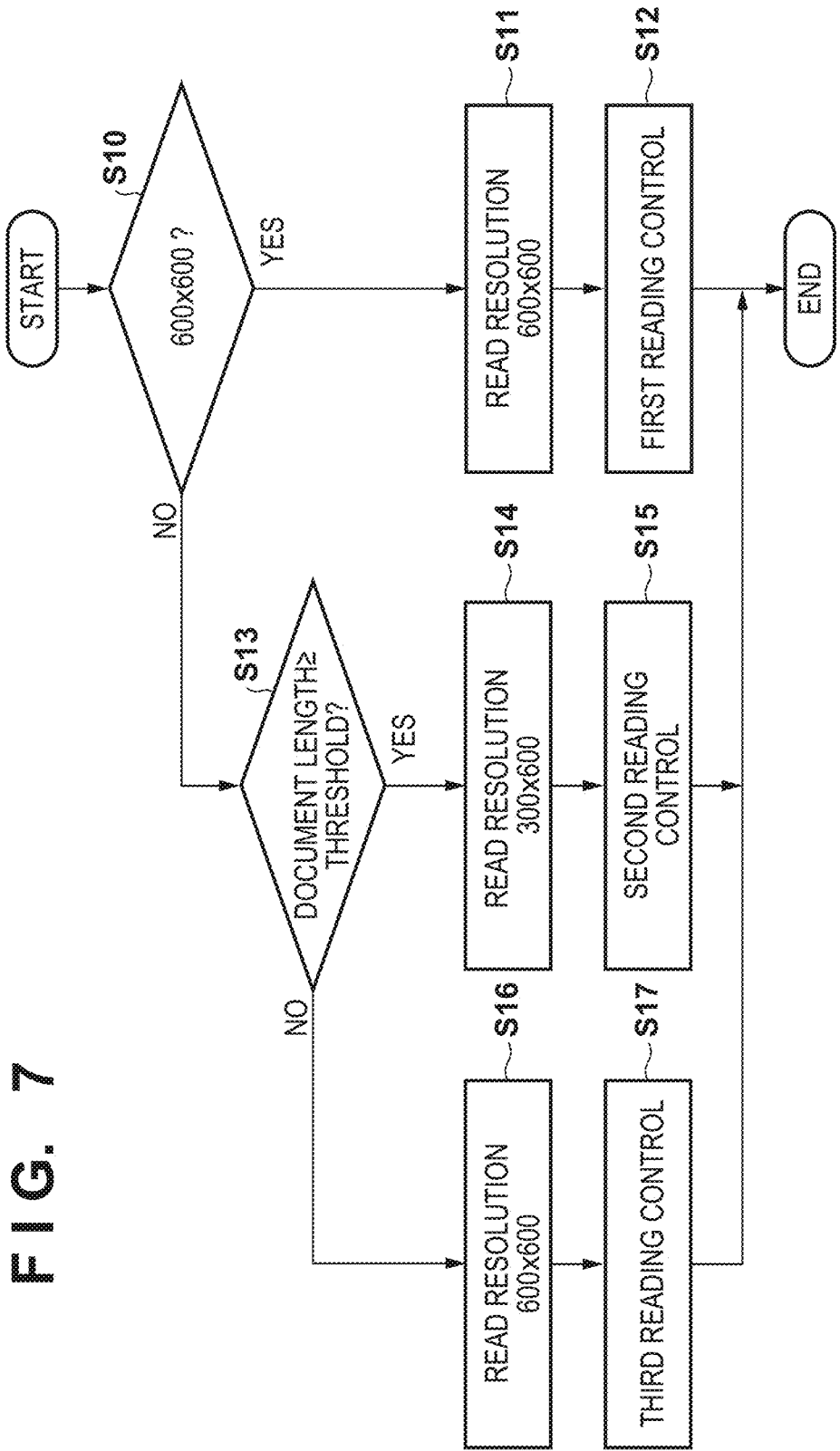
FIG. 7 is a flowchart of reading control according to an embodiment.

FIG. 7 is a flowchart of the reading control executed by the controller 2000. When the user operates the operation unit 2020 and sends a read instruction, in step S10, the controller 2000 determines the resolution set by the user. Note that in the present example, the resolution is 600×600 or 300×600. Also, note that as described above, the "X" in resolution X×Y is the main-scanning resolution and the "Y" is the sub-scanning resolution. When the resolution is 600× 600, in step S11, the controller 2000 determines the read resolution for the reading units 109A, 109B to the same 600×600 set by the user and controls the reading units 109A, 109B so that the reading units 109A, 109B read the document 101 at a resolution of 600×600. Also, in step S12, the controller 2000 executes a first reading control. When the resolution is 300×600, in step S13, the controller 2000 determines whether the size of the document 101 is equal to or greater than a predetermined size, or more specifically, whether the length (hereinafter, document length) of the document 101 in the controller 2000 is equal to or greater than a threshold. Note in the present example, the threshold is B5R, or in other words, the length of the long side of the B5 size. When the document length is equal to or greater than the threshold, in step S14, the controller 2000 determines the read resolution for the reading units 109A, 109B to the same 300×600 set by the user and controls the reading units 109A, 109B so that the reading units 109A, 109B read the document 101 at a resolution of 300×600. Also, in step S15, the controller 2000 executes a second reading control. On the other hand, when the document length is less than the threshold, in step S16, the controller 2000 determines the read resolution for the reading units 109A, 109B to 600×600, different to that set by the user, and controls the reading units 109A, 109B so that the reading units 109A, 109B read the document 101 at a resolution of 600×600. Also, in step S17, the controller 2000 executes a third reading control.

Figure 8:
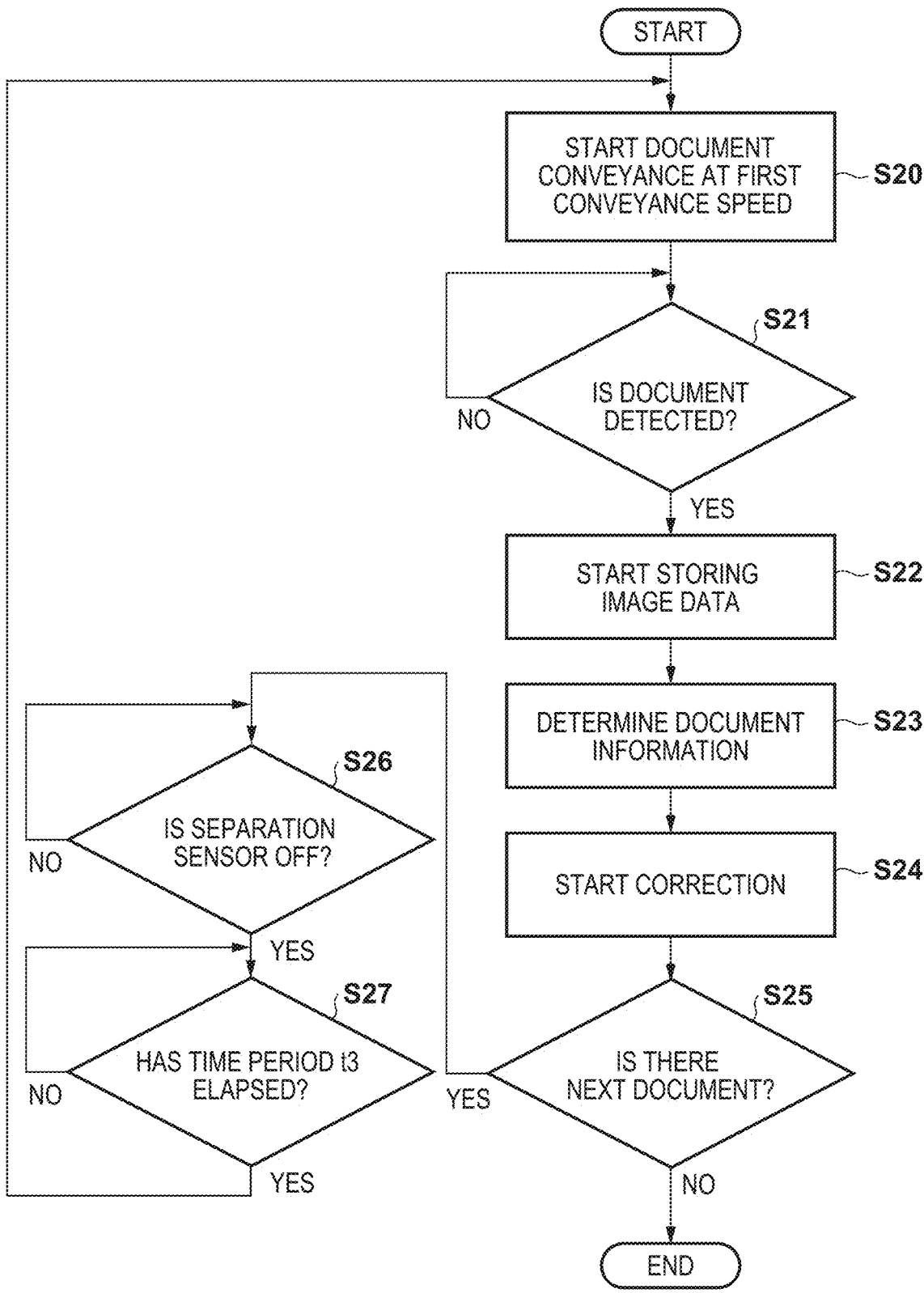
FIG. 8 is a flowchart of first reading control according to an embodiment.

FIG. 8 is a flowchart of the first reading control. In step S20, the controller 2000 feeds the document 101 on the tray 102 into the machine and conveys the document 101 at a first conveyance speed. The first conveyance speed is the conveyance speed of the document 101 in a case where the read resolution is 600×600. For example, the first conveyance speed is 210 mm/s. In step S21, the controller 2000 waits until the detection sensor 113 detects the document 101. When the detection sensor 113 detects the document 101, the CPU 203 determines the time t2 as described using FIG. 3. Then, from step S22 at the time t2, the controller 2000 starts to store the image data in the image memory 205. Note that at step S22, the output of the image data to the edge detecting unit 206 is also started. The edge detecting unit 206 executes detection processing to detect the edge of the document 101 on the leading end side. Then, in step S23, the document information determination unit 207 determines the width W and the document information on the basis of the detection result by the edge detecting unit 206.

When the determination of the document information by the document information determination unit 207 and the like is completed, in step S24, the correction unit 208 reads the image data stored in the image memory 205 by the method described above and outputs the image data to the conversion unit 211. Note that in the first reading control, the document is read at the resolution set by the user. In this case, the conversion unit 211 outputs the input image data as is without executing resolution conversion.

In step S25, the controller 2000 determines whether the next document for image reading is on the tray 102 on the basis of the detection result of the detection sensor 125. In a case where the next document is there, in step S26, the controller 2000 waits until the separation sensor 122 turns off, or, in other words, until the document being read stops being detected. When the separation sensor 122 turns off, in step S27, the controller 2000 waits a time period t3. Then, when the time period t3 elapses, the processing from step S20 is repeated. On the other hand, in step S25, when there is no next document, the controller 2000 ends the processing of FIG. 8.

Note that the time period t3 is different depending on the document size (document length). In FIG. 9A, the relationships between the document size and the document length, the time period t3, and the read productivity are illustrated. As illustrated in FIG. 9A, by having the time period t3 decrease as the document length increases, the same read productivity can be achieved regardless of the document length.

Figure 10:
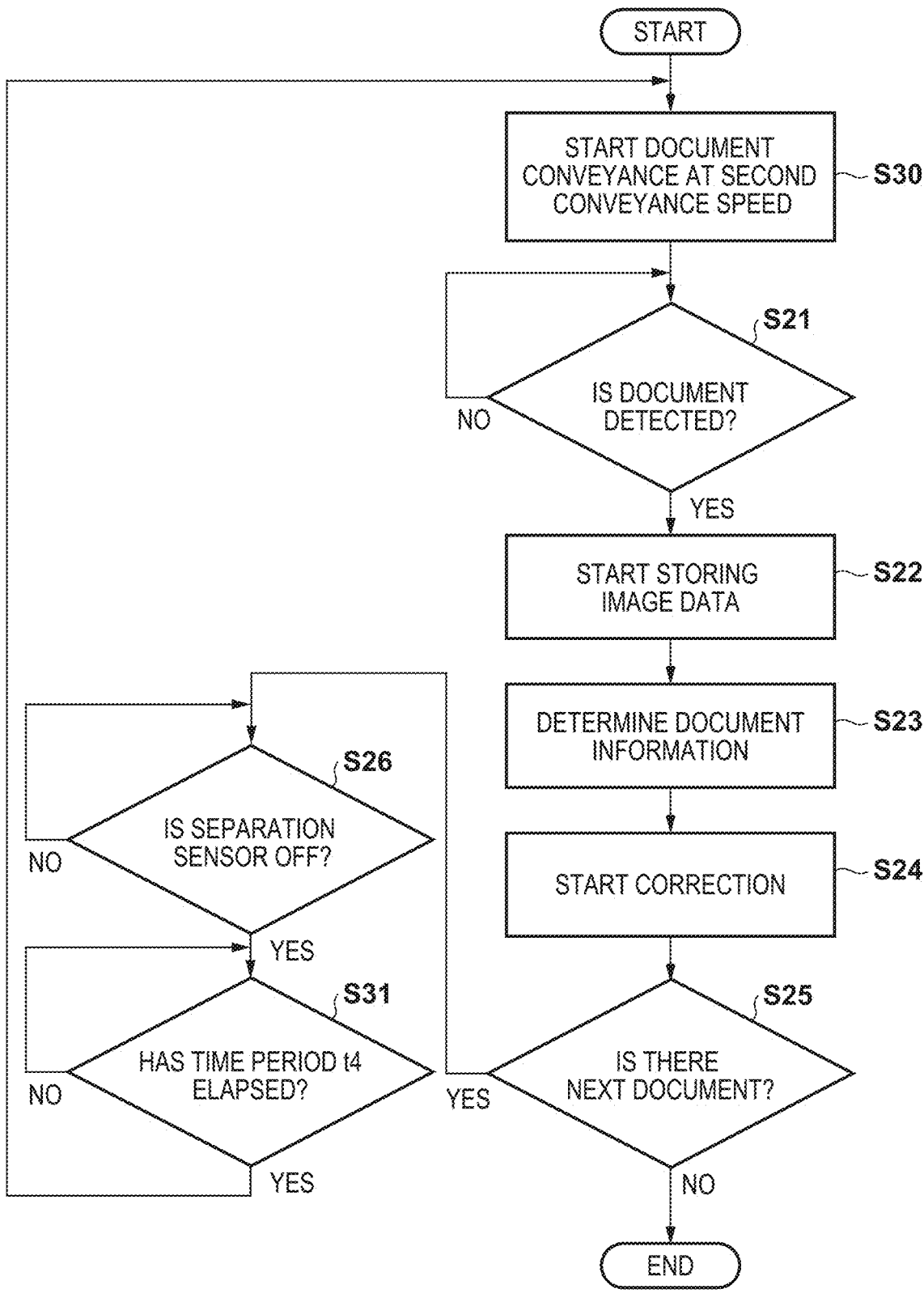
FIG. 10 is a flowchart of second reading control according to an embodiment.

FIG. 10 is a flowchart of the second reading control. Note that processing similar to that in the first reading control illustrated in FIG. 8 are given the same step number and description thereof is omitted. The second reading control is different from the first reading control in that the conveyance speed of the document is different and the time period from when the separation sensor 122 turns off until the next document is started to be fed is different. Specifically, the read resolution in the second reading control is 300×600. In the present embodiment, the conveyance speed of the document 101 when the read resolution is 300×600 is a second conveyance speed faster than the first conveyance speed. Note that the second reading control is executed when the document size is B5R or larger. Accordingly, in step S30, the controller 2000 conveys the document at the second conveyance speed. Also, in step S26, when the separation sensor 122 turns off, in step S31, the controller 2000 waits a time period t4, and when the time period t4 elapses, the processing from step S30 is repeated.

As in the first reading control, the time period t4 is different depending on the document length. In FIG. 9B, the relationships between the document size and the document length, the time period t4, and the read productivity are illustrated. As illustrated in FIG. 9B, by having the time period t4 decrease as the document length increases, the same read productivity can be achieved regardless of the document length. Note that in the second reading control, the document is read at a resolution of 300×600 as set by the user. Thus, in the second reading control as well, the conversion unit 211 outputs the input image data as is without executing resolution conversion.

Figure 11:
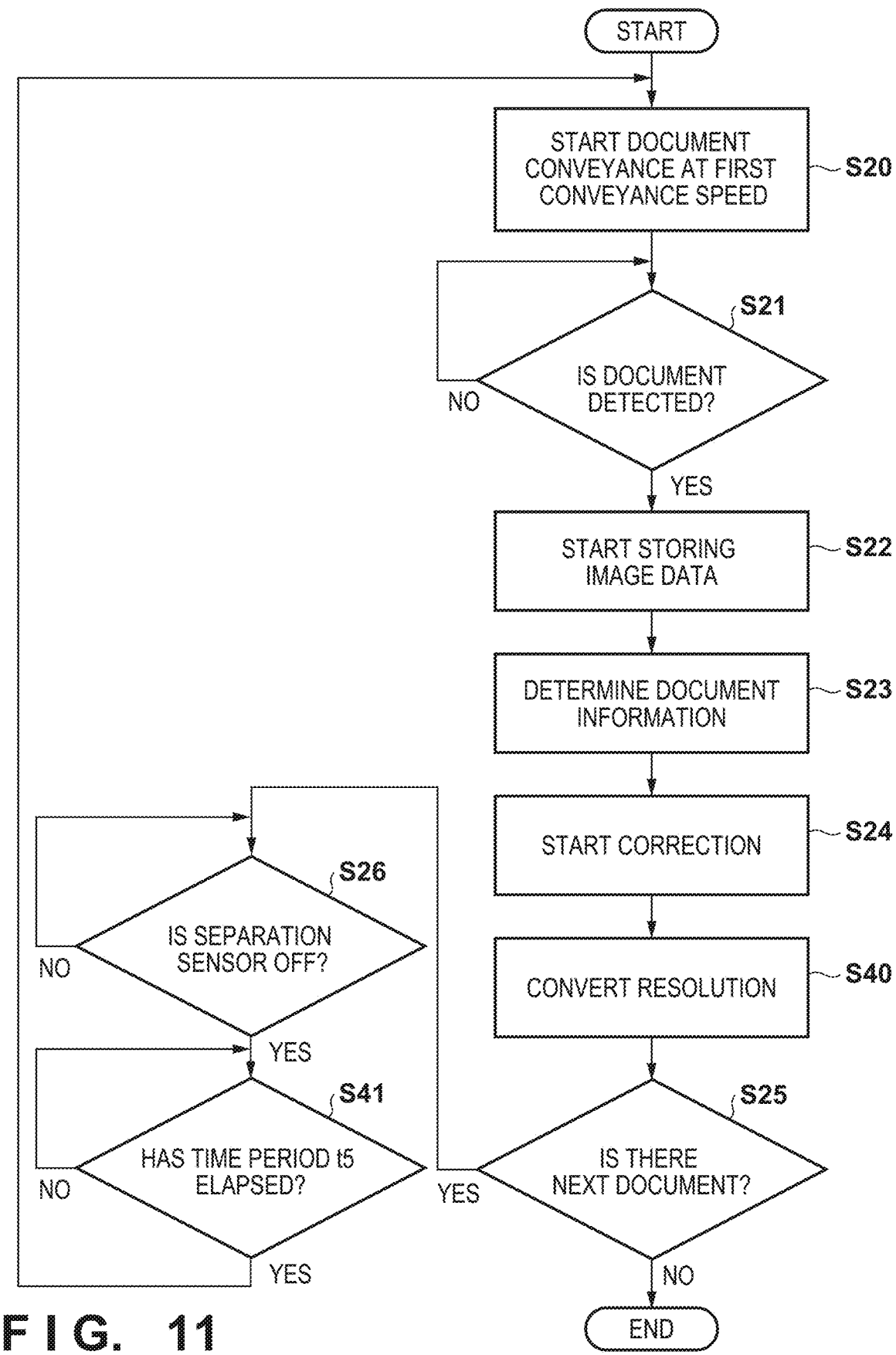
FIG. 11 is a flowchart of third reading control according to an embodiment.
Figure 12:
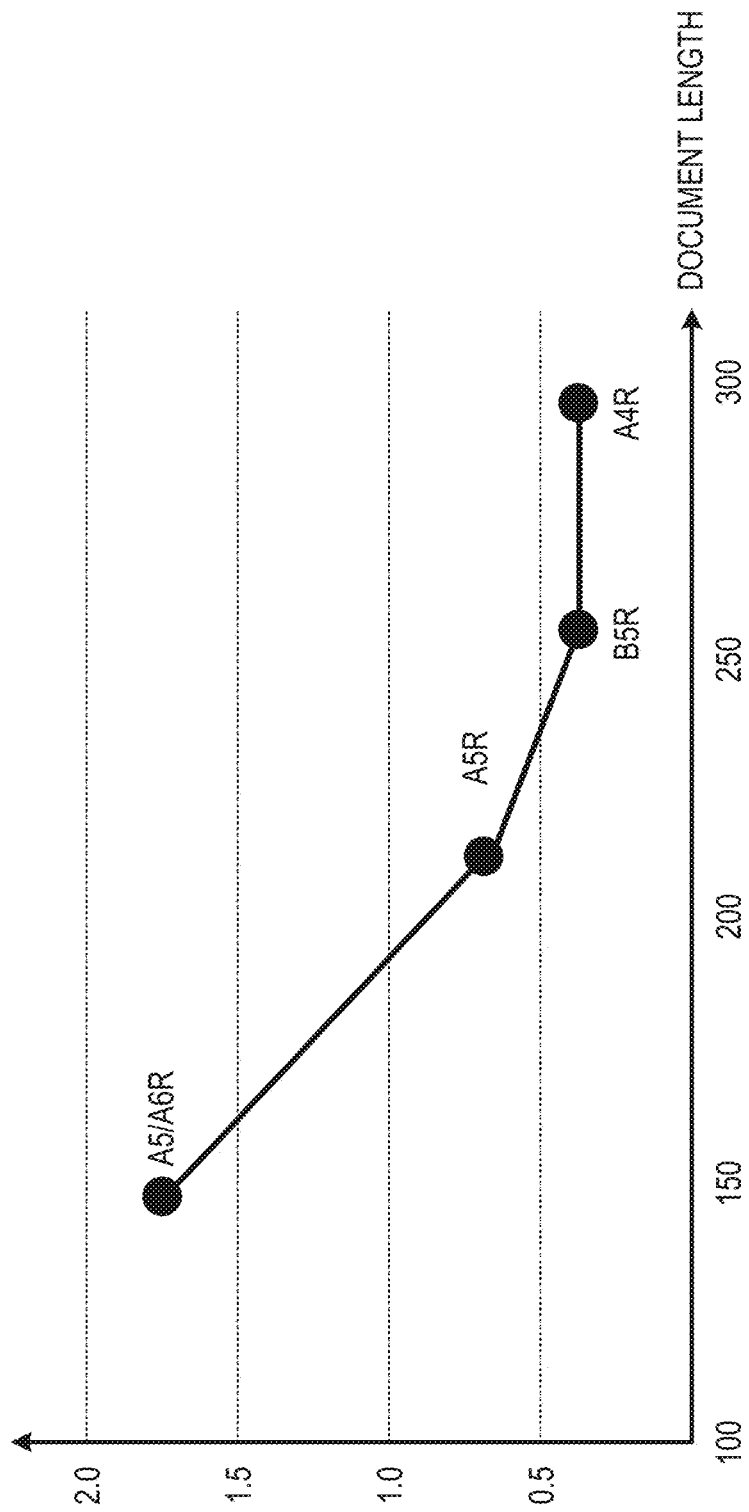
FIG. 12 is a diagram illustrating the relationship between document length and skew angle.

FIG. 11 is a flowchart of the third reading control. Note that processing similar to that in the first reading control illustrated in FIG. 8 are given the same step number and description thereof is omitted. As described above, the third reading control is executed when the user sets the resolution to 300×600 and the document size is smaller than B5R. When the document length is small, the distance (amount of time) regulated by the side regulating plate 124 is small. When the regulating distance (time) is small, there is a tendency for the skew to be greater the shorter the document length is. FIG. 12 illustrates the relationship between the document size and the skew angle. As can be understood from FIG. 12, when the document size is smaller than B5R, the skew angle increases. As described above, when the skew angle increases, the correction angle used by the correction unit 208 increases, making image degradation more likely to occur. Furthermore, in the case of reading at a resolution of 300×600, the correction angle is doubled, further increasing the likelihood of image degradation to occur. In the present embodiment, in a case where a document with a size less than B5R is read, the document is read at a resolution of 600×600 even if the user set the resolution to 300×600 to reduce the angle to be rotationally corrected.

In this manner, in the third reading control, to read the document at a resolution of 600×600, the conveyance speed is the first conveyance speed, the same as in the first reading control (step S20). In step S24, the correction unit 208 starts registration correction of the image data stored in the image memory 205 and outputs the corrected image data to the conversion unit 211. As described above, in the third reading control, the document is read at a resolution of 600×600, and not 300×600 as set by the user. Thus, in the third reading control, in step S40, the conversion unit 211 compresses the image data read at a resolution of 600×600 in the main-scanning direction and converts the image data to image data with a resolution of 300×600. Note that compression methods include thinning out the image data pixel by pixel in the main-scanning direction, averaging with two pixels per unit, and various other methods. The conversion unit 211 outputs the image data post resolution conversion.

The third reading control is different from the first reading control in that the time period from when the separation sensor 122 turns off until the next document is started to be fed is different. Specifically, in step S26, when the separation sensor 122 turns off, in step S41, the controller 2000 waits a time period t5, and when the time period t5 elapses, the processing from step S20 is repeated.

As in the first reading control, the time period t5 is different depending on the document length. In FIG. 9C, the relationships between the document size and the document length, the time period t5, and the read productivity are illustrated. As illustrated in FIG. 9C, by having the time period t5 decrease as the document length increases, the same read productivity can be achieved regardless of the document length.

In the present embodiment, when the user sets the resolution to 300×600 for a document with a short document length, the read resolution for the reading unit 109 is set to 600×600. In other words, the read resolution is changed to have the same value for the main-scanning resolution and the sub-scanning resolution. However, the main-scanning resolution of the read resolution may be set to a value higher than the set main-scanning resolution or equal to or less than the set sub-scanning resolution. With this configuration, the rotational correction amount for the correction unit can be further decreased, and the image degradation caused by rotational correction can be minimized or prevented. Note that the specific values used in the embodiments are examples to facilitate understanding, and the present invention is not limited to the specific values used in the embodiments.

To summarize, in the present embodiment, the controller 2000 determines the read resolution for the reading units 109A, 109B on the basis of the set resolution set by the user and the size of the document 101. Furthermore, the controller 2000 controls the reading units 109A, 109B so that the reading units 109A, 109B read an image at the set read resolution. For example, in a case where the user sets the resolution to a first resolution in which the main-scanning resolution is lower than the sub-scanning resolution, the controller 2000 determines whether to set the read resolution to the first resolution or a second resolution on the basis of the document size. Specifically, in a case where the main-scanning resolution is set to the first resolution, the controller 2000 reads a document with a first size at the first resolution and reads a document with a second size smaller than the first size at the second resolution. Then, after the skew angle of the image is reduced, the resolution is converted to the first resolution by the conversion unit 211. Herein, the main-scanning resolution of the second resolution is higher than the main-scanning resolution of the first resolution and equal to or less than the sub-scanning resolution of the first resolution. Note that the sub-scanning resolution of the second resolution is equal to the sub-scanning resolution of the first resolution. In the present embodiment, the main-scanning resolution of the second resolution is equal to the sub-scanning resolution of the first resolution. With this configuration, the rotational correction amount for the correction unit can be further decreased, and the image degradation caused by rotational correction can be minimized or prevented.

For example, in a case where the user sets the resolution to a third resolution in which the main-scanning resolution and the sub-scanning resolution are the same, the controller 2000 determines the third resolution to be the read resolution. Also, in a case where the set resolution is the first resolution and the read resolution is set to the second resolution, the conversion unit 211 converts the image data outputs from the correction unit 208 to the first resolution. In this manner, the resolution of the image data output from the image reading apparatus matches the resolution set by the user.

Also, in a case where a plurality of documents 101 are read, the timing for feeding the second document 101 and so on is determined on the basis of the document size (document length). With this configuration, the read productivity of each from the first reading control to the third reading control can be made constant regardless of the document size.

Second Embodiment

Figure 13:
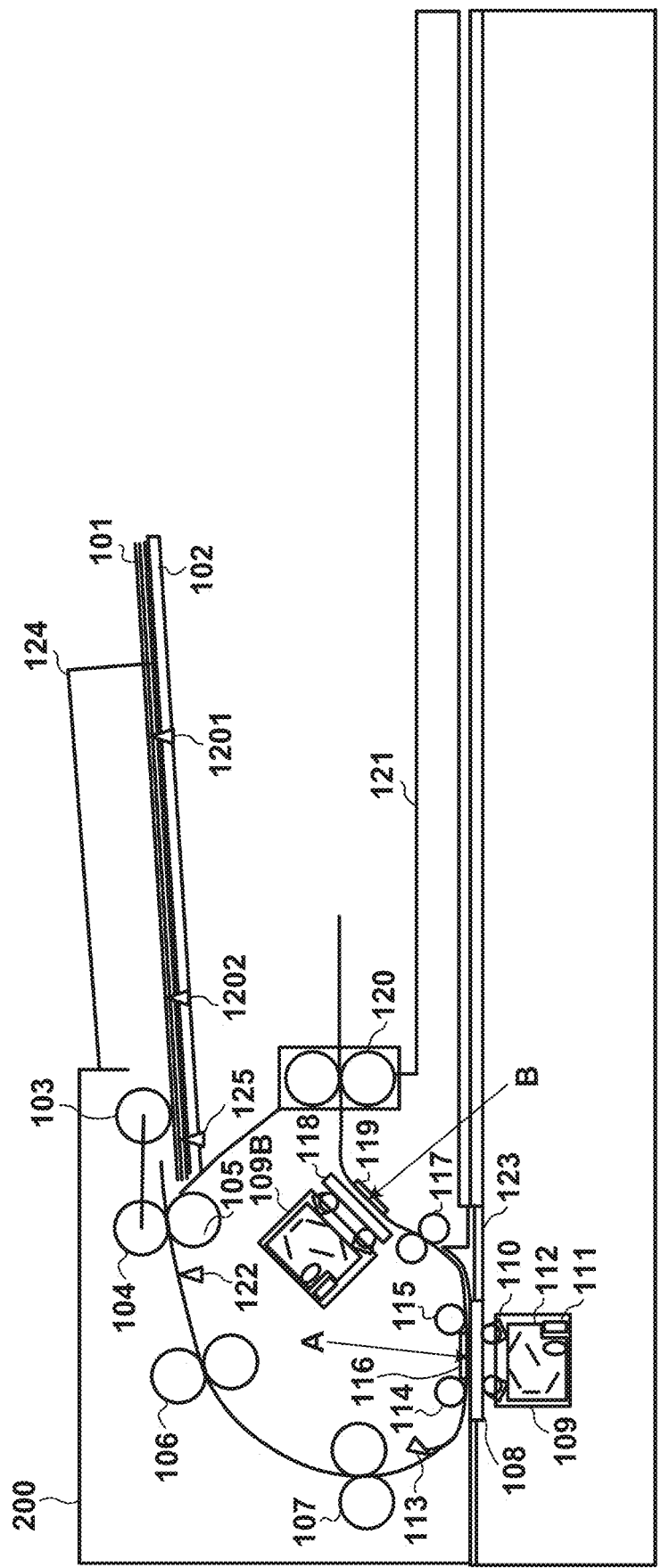
FIG. 13 is a configuration diagram of an image forming apparatus according to an embodiment.

Next, a second embodiment will be described, focusing on the points that differ from the first embodiment. FIG. 13 is a configuration diagram of the image reading apparatus 200 of the present embodiment. Note that components similar to that of the first embodiment will be given the same reference sign and description thereof will be omitted. Also, FIG. 13 is a simplified diagram that illustrates only the image reading apparatus 200 portion in an image forming apparatus. The image reading apparatus 200 of the present embodiment includes a document length detection sensor 1201 and a document width detection sensor 1202.

The document length detection sensor 1201 is disposed on a position 200 mm from the left end of the tray 102 in FIG. 13. This allows whether the document length of the document on the tray 102 is longer or shorter than 200 mm to be detected. The document width detection sensor 1202 is constituted by a volume sensor in which a resistance value changes depending on the position of the side regulating plate 124. The position of the side regulating plate 124 or, in other words, the width of the document can be detected via the resistance value. The detection result of the document length detection sensor 1201 and the document width detection sensor 1202 are input into the controller 2000.

As illustrated in FIG. 14, A4R and A5 have the same document width. However, for A4R, the document length detection sensor 1201 detects the document, and, for A5, the document length detection sensor 1201 does not detect the document. Note that the other documents have different document widths. Thus, the controller 2000 can determine the document size on the basis of the detection results of the document length detection sensor 1201 and the document width detection sensor 1202. The reading control of the present embodiment is similar to that of the first embodiment (FIGS. 7, 8, 10, and 11). However, in the present embodiment, the controller 2000 determines (step S13 in FIG. 7) whether or not the document size (document length) is larger than a predetermined size (predetermined length) on the basis of the detection results of the document length detection sensor 1201 and the document width detection sensor 1202. In other words, the user does not need to input the size of the document 101 into the image reading apparatus.

Note that in the present embodiment, the document size is determined on the basis of the detection results of the document length detection sensor 1201 and the document width detection sensor 1202. However, in another configuration, only one from among the document width detection sensor 1202 and the document length detection sensor 1201 is provided. For example, a configuration may be used in which, in a case where an A6R document is read at a resolution of 300×600 and the third reading control is executed, the document width detection sensor 1202 turns on if the width of the document on the tray 102 is 120 mm or greater. In this case, when the document width detection sensor 1202 turns off, the third reading control is executed.

In the present embodiment described above, the image reading apparatus 200 is provided with a detection unit capable of detecting the document size required for determining the read resolution. This configuration improves usability.

Third Embodiment

Next, a third embodiment will be described, focusing on the points that differ from the second embodiment. In the present embodiment, as illustrated in FIG. 1, a stop position C is provided 250 mm downstream from the separation sensor 122. The controller 2000 executes control so that the leading end of the document stops at the stop position C. In a case where the document length is 250 mm or greater, the separation sensor 122 enters a state of detecting the document in this stopped state. In a case where the document length is less than 250 mm, the separation sensor 122 does not detect the document in this stopped state. Accordingly, it is determined whether or not the document length is 250 mm or greater, i.e., whether or not the document size is B5R or greater, on the basis of the detection result of the separation sensor 122 with the document in the stopped state.

Figure 15:
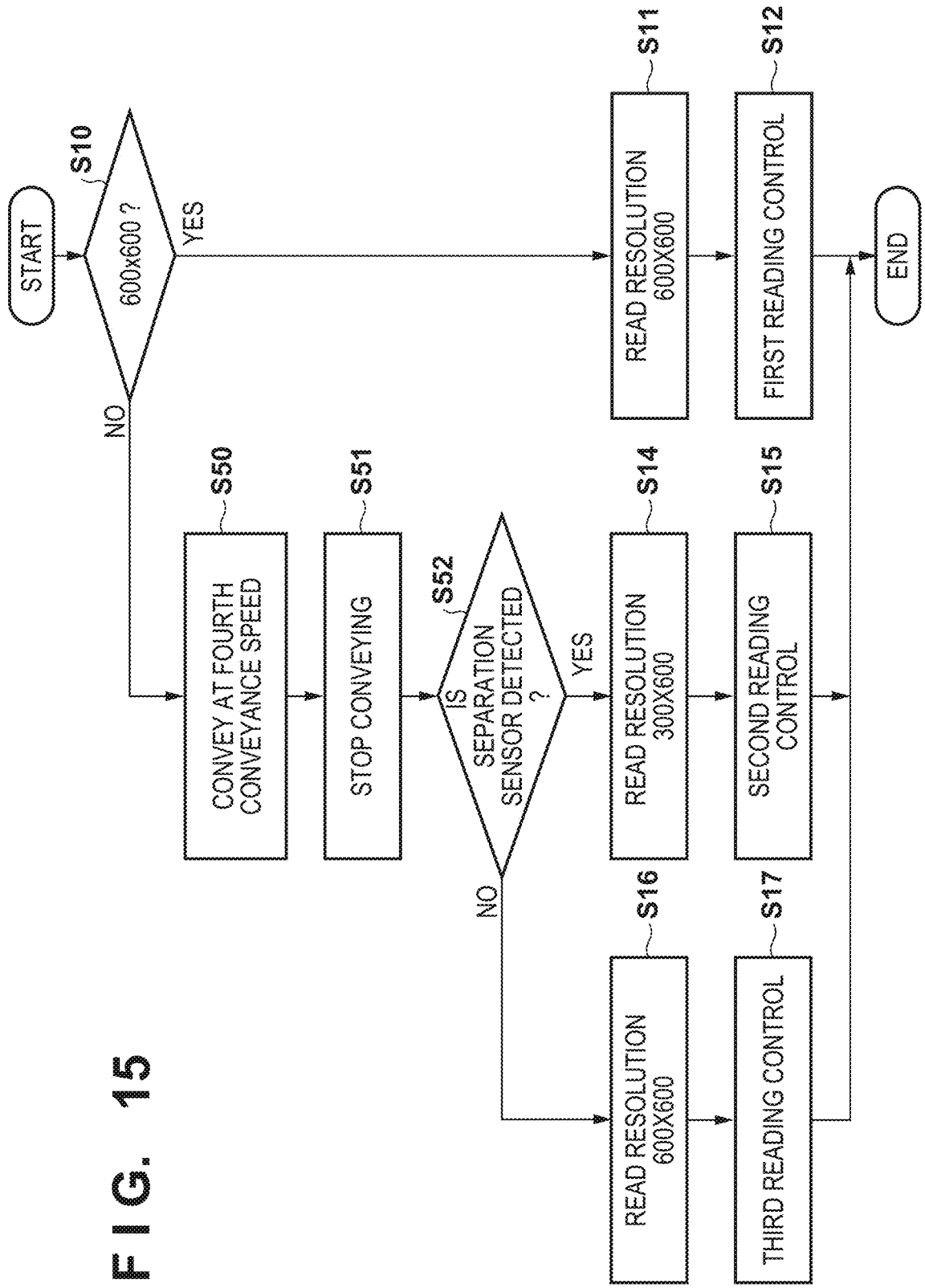
FIG. 15 is a flowchart of reading control according to an embodiment.
Figure 16A:
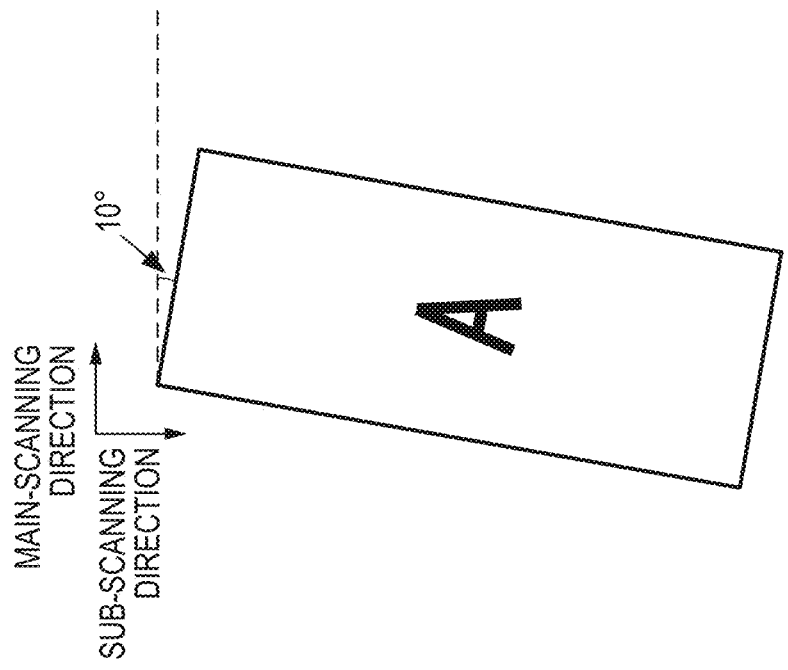
FIGS. 16A and 16B are explanatory diagrams of the relationship between resolution and skew angle.
Figure 16B:
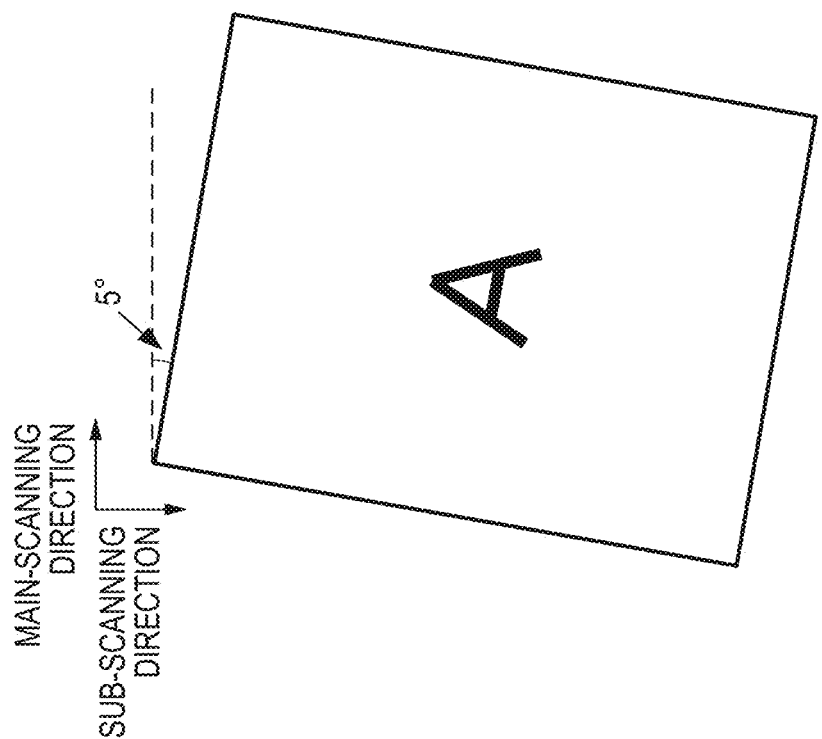

FIG. 15 is a flowchart of the reading control of the present embodiment. Note that processing steps that are similar to those in the flowchart of FIG. 7 are given the same reference sign and descriptions thereof are omitted. When the user set resolution is 300×600, in step S50, the controller 2000 feeds the document and conveys the document at a fourth conveyance speed. The fourth conveyance speed is, for example, 210 mm/s. In step S51, the controller 2000 stops conveying the document where the leading end of the document is at the stop position C. The stop position C is 250 mm downstream from the separation sensor 122. Thus, the controller 2000 can determine the timing of the leading end of the document arriving at the stop position C from the amount of time from when the leading end of the document is detected by the separation sensor 122. In step S52, the controller 2000 determines the detection state of the document by the separation sensor 122. In step S52, in a case where the separation sensor 122 detects the document, in step S14, the controller 2000 set the read resolution to 300×600, and in step S15, the controller 2000 executes the second reading control. On the other hand, in a case where the separation sensor 122 does not detect the document, in step S16, the controller 2000 set the read resolution to 600×600, and in step S17, the controller 2000 executes the third reading control.

Note that in another embodiment, the conveyance of the document 101 may not be stopped, and the read resolution and the reading control to be executed may be determined on the basis of the detection result of the separation sensor 122 when the leading end of the document 101 reaches the stop position C.

In the present embodiment described above, the document size required to determine the read resolution is determined without providing a dedicated member for detecting the document size. This configuration can keep costs down and improves usability.

Note that in the first to third embodiments, the document information determination unit 207 determines the inclination angle $\theta 1$ of the shadow caused by the edge of the document 101 on the leading end side with respect to the main-scanning direction. However, not such limitation is intended. For example, the document information determination unit 207 may determine an inclination angle $\theta 2$ of the shadow caused by the edge of the side end (for example, the left end) of the document 101 with respect to the sub-scanning direction. In this case, the correction unit 208 reads the image data on the basis of the angle $\theta 2$.

Note that in the first to third embodiment, the correction unit 208 reads image data, with one of two corner portions of the edge of the image of the document on the leading end side being brought closer to the reference position (1, 1). However, no such limitation is intended. For example, the correction unit 208 may read the image data with the other corner portion (on the right side in FIG. 5) of the two corner portions of the document on the leading end side being brought closer to a reference position of (7488, 1). As a result, the shadow of the document on the leading end side and the shadow on the right end in the image data is reduced. In such a configuration, the system controller 151, for example, trims the image data using as a reference the position (7488, 1) of the image data illustrated in FIG. 6B output from the correction unit 208 to correspond to the size of the recording medium set by the user using the operation unit 2020.

Also, for example, the correction unit 208 may translate the image data in parallel, with the central position in the main-scanning direction of the document on the leading end side being brought closer to a reference position of (3744, 1). As a result, the shadow of the document on the leading end side in the image data is reduced. In such a configuration, the system controller 151, for example, trims the image data using as a reference the position (3744, 1) of the image data illustrated in FIG. 6B output from the correction unit 208 to correspond to the size of the recording medium set by the user using the operation unit 2020. Specifically, the system controller 151 trims the image data in the main-scanning direction so that the left and right length are made symmetrical using as a reference the x-coordinate 3743 and trims the image data in the sub-scanning direction using as a reference the y-coordinate 0.

Note that in the present embodiment, the correction unit 208 sets the start position and the read direction for the reading of the image data stored in the image memory 205 and reads the image data on the basis of the set position and direction. However, no such limitation is intended. For example, the correction unit 208 may correct the image data by rotating and by performing parallel translation, via conversion such as affine transformation, on the image of the document represented by the image data. Specifically, for example, as illustrated in FIG. 6A, the correction unit 208 may rotate the image of the document illustrated in FIG. 5 to reduce the angle $\theta 1$ and, as illustrated in FIG. 6B, may perform parallel translation of the image of the document to move the position (x1, y1) to the reference position (1, 1).

The image printing device 301 may include the configurations of the edge detecting unit 206, the document information determination unit 207, the correction unit 208, and the like of the present embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-019128, filed on Feb. 6, 2020, which is hereby incorporated by reference herein in its entirety.

What is claimed is:

1. An image reading apparatus comprising:
a stacking unit where a document is to be stacked;
a conveying unit configured to convey the document stacked on the stacking unit in a first direction;
a regulating unit configured to regulate a position, in a second direction orthogonal to the first direction, of the document stacked on the stacking unit;
a reading unit configured to read an image of the document conveyed by the conveying unit, the reading unit including a light-receiving element configured to receive light; and
at least one processor configured to:
generate image data representing a light receiving result by the light-receiving element;
set a reading resolution in the first direction when the reading unit reads the image of the document and a reading resolution in the second direction when the reading unit reads the image of the document, the reading unit reading the image of the document at the set reading resolution;
determine an inclination amount corresponding to an inclination angle of an edge of the document on a leading end side in the first direction with respect to the second direction on the basis of the generated image data;
correct an image represented by the generated image data to reduce the inclination amount;
output image data indicative of an corrected image; and
obtain information relating to a length in the first direction of the document to be read by the reading unit,
wherein in a case where a length in the first direction of the document is greater than a predetermined length and the at least one processor outputs the image data indicative of the corrected image, whose resolution in the first direction is a first resolution and resolution in the second direction is a second resolution lower than the first resolution, the at least one processor sets the reading resolution in the first direction to the first resolution and sets the reading resolution in the second direction to the second resolution, and
wherein in a case where the length in the first direction of the document is less than the predetermined length and the at least one processor outputs the image data indicative of the corrected image, whose resolution in the first direction is the first resolution and resolution in the second direction is the second resolution, the at least one processor sets the reading resolution in the first direction to the first resolution and sets the reading resolution in the second direction to a third resolution higher than the second resolution.

2. The image reading apparatus according to claim 1, wherein in a case where the length in the first direction of the document is less than the predetermined length and the at least one processor outputs image data indicative of the corrected image, whose resolution in the first direction is the first resolution and resolution in the second direction is the second resolution, the at least one processor sets the reading resolution in the first direction to the first resolution.

3. The image reading apparatus according to claim 1, wherein the third resolution is equal to or less than the first resolution.

4. The image reading apparatus according to claim 1, further comprising a sensor that is provided on the stacking unit and configured to detect a presence of the document, wherein the at least one processor is further configured to obtain the information relating to the length in the first direction of the document on the basis of a detection result of the sensor.

5. The image reading apparatus according to claim 1, further comprising a sensor that is provided on a conveyance guide configured to guide the document conveyed by the conveying unit and configured to detect a presence of the document,
wherein the at least one processor is further configured to obtain the information relating to the length in the first direction of the document on the basis of a detection result of the sensor.

6. The image reading apparatus according to claim 1, wherein in a case where the at least one processor outputs the image data indicative of the corrected image, whose resolution in the second direction is the second resolution, and sets the reading resolution in the second direction to the third resolution, the at least one processor is further configured to convert the resolution in the second direction of the image data from the third resolution to the second resolution.

7. The image reading apparatus according to claim 1, further comprising an opposing member provided on an opposite side to the reading unit with respect to a conveyance path along which the document is conveyed, at a reading position where the reading unit reads an image of the document,
wherein the reading unit includes a light source configured to emit light, and
the at least one processor is further configured to detect a shadow on the opposing member caused by light emitted from the light source and the document being conveyed, and determine the inclination amount on the basis of image data corresponding to the shadow.

8. The image reading apparatus according to claim 7, wherein the opposing member is white.

9. An image forming apparatus comprising:
a stacking unit where a document is to be stacked;
a conveying unit configured to convey the document stacked on the stacking unit in a first direction;
a regulating unit configured to regulate a position, in a second direction orthogonal to the first direction, of the document stacked on the stacking unit;
a reading unit configured to read an image of the document conveyed by the conveying unit, the reading unit including a light-receiving element configured to receive light; and
at least one processor configured to:
generate image data representing a light receiving result by the light-receiving element;
set a reading resolution in the first direction when the reading unit reads the image of the document and a reading resolution in the second direction when the reading unit reads the image of the document, the reading unit reading the image of the document at the set resolution;
determine an inclination amount corresponding to an inclination angle of an edge of the document on a leading end side in the first direction with respect to the second direction on the basis of the generated image data;
correct an image represented by the generated image data to reduce the inclination amount;
output image data indicative of an corrected image; and
obtain information relating to a length in the first direction of the document to be read by the reading unit; and
an image forming unit configured to form on a recording medium an image based on the image data output by the at least one processor,
wherein in a case where a length in the first direction of the document is greater than a predetermined length and the at least one processor outputs the image data indicative of the corrected image, whose resolution in the first direction is a first resolution and resolution in the second direction is a second resolution lower than the first resolution, the at least one processor sets the reading resolution in the first direction to the first resolution and sets the reading resolution in the second direction to the second resolution, and
wherein in a case where the length in the first direction of the document is less than the predetermined length and the at least one processor outputs the image data indicative of the corrected image, whose resolution in the first direction is the first resolution and resolution in the second direction is the second resolution, the at least one processor sets the reading resolution in the first direction to the first resolution and sets the reading resolution in the second direction to a third resolution higher than the second resolution.

10. An image reading apparatus comprising:
a stacking unit where a document is to be stacked;
a conveying unit configured to convey the document stacked on the stacking unit in a conveyance direction;
a regulating unit configured to regulate a position, in a width direction orthogonal to the conveyance direction, of the document stacked on the stacking unit;
a reading unit including a light receiving element configured to receive light, the reading unit being configured to read an image of the document being conveyed by the conveying unit using the light receiving element,
at least one processor configured to:
obtain information relating a first setting resolution corresponding to a resolution in a first direction corresponding to the conveyance direction and a second setting resolution corresponding to a resolution in a second direction corresponding to the width direction, and
obtain information relating to a length in the conveyance direction of the document to be conveyed by the conveying unit, and
wherein, in a case where a length in the conveyance direction of the document is less than a predetermined length and the first setting resolution is set to a first resolution and the second setting resolution is set to a second resolution lower than the first resolution, the reading unit is configured to output an image data whose resolution in the first direction is the first setting resolution and resolution in the second direction is a third resolution higher than the second resolution,
wherein, in a case where the length in the conveyance direction of the document is larger than the predetermined length and the first setting resolution is set to the first resolution and the second setting resolution is set to the second resolution, the reading unit is configured to output an image data whose resolution in the first direction is the first setting resolution and resolution in the second direction is the second setting resolution,
wherein the at least one processor is configured to:
receive the image data output from the reading unit;
determine an inclination amount corresponding to an inclination angle of an edge of the document on a leading end side in the conveyance direction with respect to the width direction on the basis of the received image data;
correct the received image data so as to reduce the inclination amount,
convert a resolution in the second direction of the corrected image to the second resolution from the third resolution, and output image data whose resolution in the second direction is converted to the second resolution in the case where the length in the conveyance direction of the document is less than the predetermined length and the first setting resolution is set to the first resolution and the second setting resolution is set to the second resolution; and
output the corrected image data without converting a resolution in the second direction of the corrected image data in the case where the length in the conveyance direction of the document is larger than the predetermined length and the first setting resolution is set to the first resolution and the second setting resolution is set to the second resolution.

11. The image reading apparatus according to claim 10, wherein the third resolution is equal to or less than the first resolution.

12. The image reading apparatus according to claim 10, further comprising a sensor that is provided on the stacking unit and configured to detect a presence of the document,
wherein the at least one processor is configured to obtain the information relating to the length in the conveyance direction of the document on the basis of a detection result of the sensor.

13. The image reading apparatus according to claim 10, further comprising a sensor that is provided on a conveyance guide configured to guide the document conveyed by the conveying unit and configured to detect a presence of the document,
wherein the at least one processor is configured to obtain the information relating to the length in the conveyance direction of the document on the basis of a detection result of the sensor.

14. The image reading apparatus according to claim 10, further comprising an opposing member provided on an opposite side to the reading unit with respect to a conveyance path along which the document is conveyed, at a reading position where the reading unit reads the image of the document,
wherein the reading unit includes a light source configured to emit light, and
the at least one processor is configured to detect a shadow on the opposing member caused by light emitted from the light source and the document being conveyed, and determine the inclination amount on the basis of image data corresponding to the shadow.

15. The image reading apparatus according to claim 14, wherein the opposing member is white.

* * * * *